United States Patent
Nishikawa et al.

(12) 
(10) Patent No.: US 11,788,583 B1
(45) Date of Patent: Oct. 17, 2023

(54) CLUTCH DEVICE AND MOTORCYCLE

(71) Applicant: Kabushiki Kaisha F.C.C., Hamamatsu (JP)

(72) Inventors: Junichi Nishikawa, Hamamatsu (JP); Jun Komukai, Hamamatsu (JP); Satoshi Ota, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/218,292

(22) Filed: Jul. 5, 2023

(30) Foreign Application Priority Data

Jul. 6, 2022 (JP) .................................. 2022-109218
Oct. 28, 2022 (JP) .................................. 2022-172870

(51) Int. Cl.
*F16D 13/56* (2006.01)

(52) U.S. Cl.
CPC ........ *F16D 13/56* (2013.01); *F16D 2013/565* (2013.01)

(58) Field of Classification Search
CPC ............................ F16D 13/56; F16D 2013/565
See application file for complete search history.

(56) References Cited

U.S. PATENT DOCUMENTS

| 2006/0096077 A1* | 5/2006 | Kataoka | F16D 13/56 29/527.5 |
|---|---|---|---|
| 2009/0071789 A1 | 3/2009 | Kataoka et al. | |
| 2009/0071792 A1 | 3/2009 | Kataoka et al. | |
| 2016/0333943 A1 | 11/2016 | Chiba et al. | |
| 2019/0285123 A1* | 9/2019 | Imanishi | F16D 23/12 |
| 2020/0158194 A1 | 5/2020 | Kataoka et al. | |
| 2020/0340536 A1 | 10/2020 | Nishikawa et al. | |
| 2023/0136770 A1 | 5/2023 | Ozawa et al. | |

FOREIGN PATENT DOCUMENTS

| JP | 52-41754 A | 3/1977 | |
|---|---|---|---|
| JP | 2001-263464 A | 9/2001 | |
| JP | 2008-051156 A | 3/2008 | |
| JP | 2009-002405 A | 1/2009 | |
| JP | 2009-068577 A | 4/2009 | |
| JP | 2009-068578 A | 4/2009 | |
| JP | 2016-211688 A | 12/2016 | |
| JP | 2019-027483 A | 2/2019 | |
| JP | 6903020 B2 | 7/2021 | |
| WO | WO-2007034696 A1 * | 3/2007 | ............ F16D 13/04 |
| WO | 2021/210198 A1 | 10/2021 | |

OTHER PUBLICATIONS

Official Communication issued in Japanese Patent Application No. 2022-172870, dated Dec. 20, 2022.
Official Communication issued in Japanese Patent Application No. 2022-172870, dated Mar. 28, 2023.

* cited by examiner

*Primary Examiner* — Lori Wu
(74) *Attorney, Agent, or Firm* — KEATING AND BENNETT, LLP

(57) ABSTRACT

A clutch device includes a clutch center holding output-side rotating plates alternately arranged with input-side rotating plates, and a pressure plate movable toward or away from the clutch center. The pressure plate includes pressure-side fitting teeth holding the output-side rotating plates. The clutch center includes center-side fitting teeth holding the output-side rotating plates. In a half-clutch state, a portion of one of the center-side fitting teeth overlap with a portion of one of the pressure-side fitting teeth when seen in the radial directions of an output shaft.

9 Claims, 23 Drawing Sheets

CLUTCH DEVICE AND MOTORCYCLE

CROSS REFERENCE TO RELATED APPLICATIONS

This application claims the benefit of priority to Japanese Patent Application No. 2022-109218 filed on Jul. 6, 2022 and Japanese Patent Application No. 2022-172870 filed on Oct. 28, 2022. The entire contents of these applications are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 6903020, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device includes an assembly of the clutch center and the pressure plate.

In the clutch device of Japanese Patent No. 6903020, as portions holding the output-side rotating plates, the clutch center includes center-side fitting teeth (outer peripheral wall including splines), and the pressure plate includes pressure-side fitting teeth. In a state where the clutch center and the pressure plate are assembled, the center-side fitting teeth and the pressure-side fitting teeth overlap with each other in the radial direction.

When the pressure plate is separated from the clutch center, a gap can be formed between the pressure-side fitting teeth and the center-side fitting teeth in the direction in which the pressure plate moves (i.e., axial direction of the output shaft). In this case, for example, clutch oil flowing in the clutch center flows to the outside through the gap, and thus, clutch oil does not easily flow to the output-side rotating plates held by the pressure plate, disadvantageously.

SUMMARY OF THE INVENTION

Preferred embodiments of the present disclosure provide clutch devices each capable of supplying a larger amount of clutch oil to output-side rotating plates held by pressure-side fitting teeth of a pressure plate, and motorcycles including such clutch devices.

A clutch device according to a preferred embodiment of the present disclosure is a clutch device to allow or interrupt transfer of a rotation driving force to an output shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates, wherein the pressure plate includes a plurality of pressure-side fitting teeth holding at least one of the output-side rotating plates and arranged in circumferential directions, the clutch center includes an output shaft holding portion to which the output shaft is coupled, an outer peripheral wall located radially outward of the output shaft holding portion, and a plurality of center-side fitting teeth holding the output-side rotating plates, projecting radially outward from an outer peripheral surface of the outer peripheral wall, and arranged in circumferential directions, and in the half-clutch state, a portion of one of the center-side fitting teeth overlap with a portion of one of the pressure-side fitting teeth when seen in radial directions of the output shaft.

In a clutch device according to a preferred embodiment of the present disclosure, in the half-clutch state, a portion of one of the center-side fitting teeth overlap with a portion of one of the pressure-side fitting teeth when seen in the radial directions of the output shaft. That is, in the half-clutch state, no gap is formed between the pressure-side fitting teeth and the center-side fitting teeth in the direction in which the pressure plate moves, and thus, clutch oil flowing in the clutch center does not flow directly to the outside and flows to the pressure plate, for example. As a result, a larger amount of clutch oil is supplied to the output-side rotating plates held by the pressure plate.

Another clutch device according to a preferred embodiment of the present disclosure is a clutch device to allow or interrupt transfer of a rotation driving force of an input shaft to an output shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, and a pressure plate movable toward or away from the clutch center and rotatable relative to the clutch center to press the input-side rotating plates and the output-side rotating plates, wherein the pressure plate includes a plurality of pressure-side fitting teeth holding at least one of the output-side rotating plates and arranged in circumferential directions, the clutch center includes an output shaft holding portion to which the output shaft is coupled, an outer peripheral wall located radially outward of the output shaft holding portion, and a plurality of center-side fitting teeth holding the output-side rotating plates, projecting radially outward from an outer peripheral surface of the outer peripheral wall, and arranged in circumferential directions, and in a clutch disengaged state, a portion of one of the center-side fitting teeth overlap with a portion of one of the pressure-side fitting teeth when seen in radial directions of the output shaft.

In a clutch device according to a preferred embodiment of the present disclosure, in a clutch disengaged state, a portion of one of the center-side fitting teeth overlap with a portion of one of the pressure-side fitting teeth when seen in the radial directions of the output shaft. That is, in the clutch disengaged state, no gap is formed between the pressure-side fitting teeth and the center-side fitting teeth in the direction in which the pressure plate moves, and thus, clutch oil flowing in the clutch center does not flow directly to the outside and flows to the pressure plate, for example. As a result, a larger amount of clutch oil is supplied to the output-side rotating plates held by the pressure plate.

In yet another clutch device according to a preferred embodiment of the present disclosure is a clutch device to allow or interrupt a rotation driving force of an input shaft to an output shaft, and includes a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged, a pressure plate movable toward or away from the clutch center and rotatable relative to the clutch center to press the input-side rotating plates and the output-side rotating plates, and a stopper plate operable to contact the pressure plate and to suppress separation of the pressure plate from the clutch center by a predetermined distance or more, wherein the pressure plate includes a plurality of pressure-side fitting teeth holding at least one of the output-side rotating plates and arranged in circumferential directions, the clutch center includes an output shaft holding portion to which the output shaft is coupled, an outer peripheral wall located radially outward of the output shaft holding portion, and a plurality of center-side fitting teeth holding the output-side rotating plates, projecting radially outward from an outer peripheral surface of the outer peripheral wall, and arranged in circumferential directions, and in a state where the pressure plate is in contact with the stopper plate, a portion of one of the center-side fitting teeth overlap with a portion of one of the pressure-side fitting teeth when seen in radial directions of the output shaft.

In a clutch device according to a preferred embodiment of the present disclosure, in a state where the pressure plate is in contact with the stopper plate, a portion of one of the center-side fitting teeth overlap with a portion of one of the pressure-side fitting teeth when seen in the radial directions of the output shaft. That is, in the state where the pressure plate is in contact with the stopper plate, no gap is formed between the pressure-side fitting teeth and the center-side fitting teeth in the direction in which the pressure plate moves, and thus, clutch oil flowing in the clutch center does not flow directly to the outside and flows to the pressure plate, for example. As a result, a larger amount of clutch oil is supplied to the output-side rotating plates held by the pressure plate.

Preferred embodiments of the present disclosure provide clutch devices each capable of supplying a larger amount of clutch oil to output-side rotating plates held by pressure-side fitting teeth of a pressure plate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
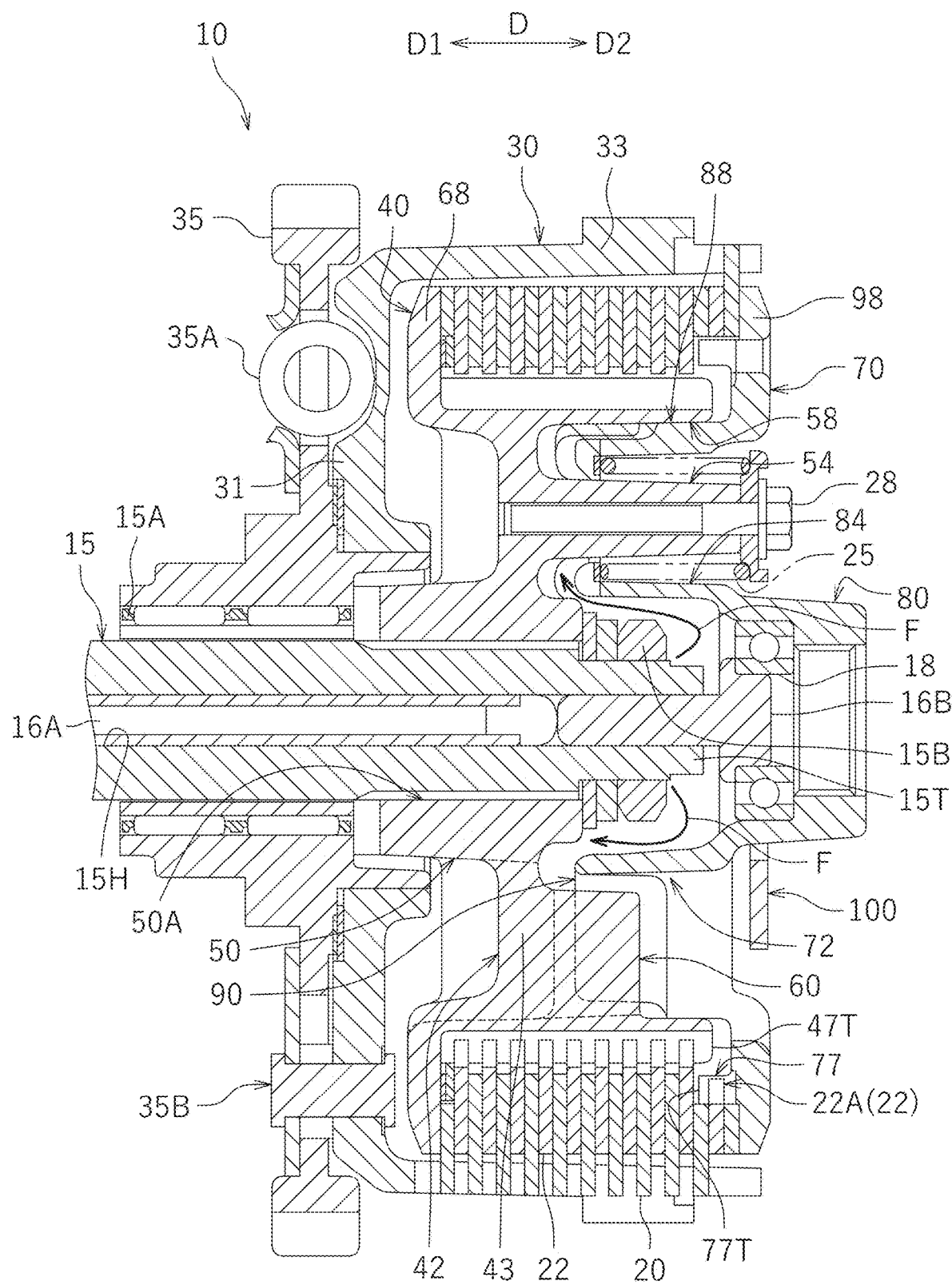
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 is movable toward and away from the clutch center 40 will be referred to as directions D (an example of a movement direction), a direction in which the pressure plate 70 moves toward the clutch center 40 will be referred to as a first direction D1, and a direction in which the pressure plate 70 is movable away from the clutch center 40 will be referred to as a second direction D2. Circumferential directions of the clutch center 40 and the pressure plate 70 will be referred to as circumferential directions S, one of the circumferential direction S from one pressure-side cam portion 90 to another pressure-side cam portion 90 will be referred to as a first circumferential direction S1 (see FIG. 5A), and one of the circumferential direction S from the other pressure-side cam portion 90 to the one pressure-side cam portion 90 will be referred to as a second circumferential direction S2 (see FIG. 5A). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

As illustrated in FIG. 1, the clutch device 10 includes the output shaft 15, input-side rotating plates 20, output-side rotating plates 22, the clutch housing 30, the clutch center 40, the pressure plate 70, and a stopper plate 100.

As illustrated in FIG. 1, the output shaft 15 is a hollow shaft. One end of the output shaft 15 rotatably supports an input gear 35 described later and the clutch housing 30 through a needle bearing 15A. The output shaft 15 fixedly supports a clutch center 40 through a nut 15B. That is, the output shaft 15 rotates together with the clutch center 40. The other end of the output shaft 15 is coupled to a transmission (not shown) of an automobile, for example.

As illustrated in FIG. 1, the output shaft 15 includes, in a hollow portion 15H thereof, a push rod 16A and a push member 16B adjacent to the push rod 16A. The hollow portion 15H serves as a channel of clutch oil. Clutch oil flows in the output shaft 15, that is, in the hollow portion 15H. The push rod 16A and the push member 16B are slidable in the hollow portion 15H of the output shaft 15. The push rod 16A has one end (left end in the drawing) coupled to a clutch operation lever (not shown) of the motorcycle, and slides in the hollow portion 15H by operation of the clutch operation lever and presses the clutch push member 16B in the second direction D2. A portion of the push member 16B projects outward of the output shaft 15 (in the second direction D2 in this preferred embodiment) and is coupled to a release bearing 18 provided on the pressure plate 70. The push rod 16A and the push member 16B are thinner than the inner diameter of the hollow portion 15H so that flowability of clutch oil is obtained in the hollow portion 15H.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the second direction D2. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 are rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers is formed between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
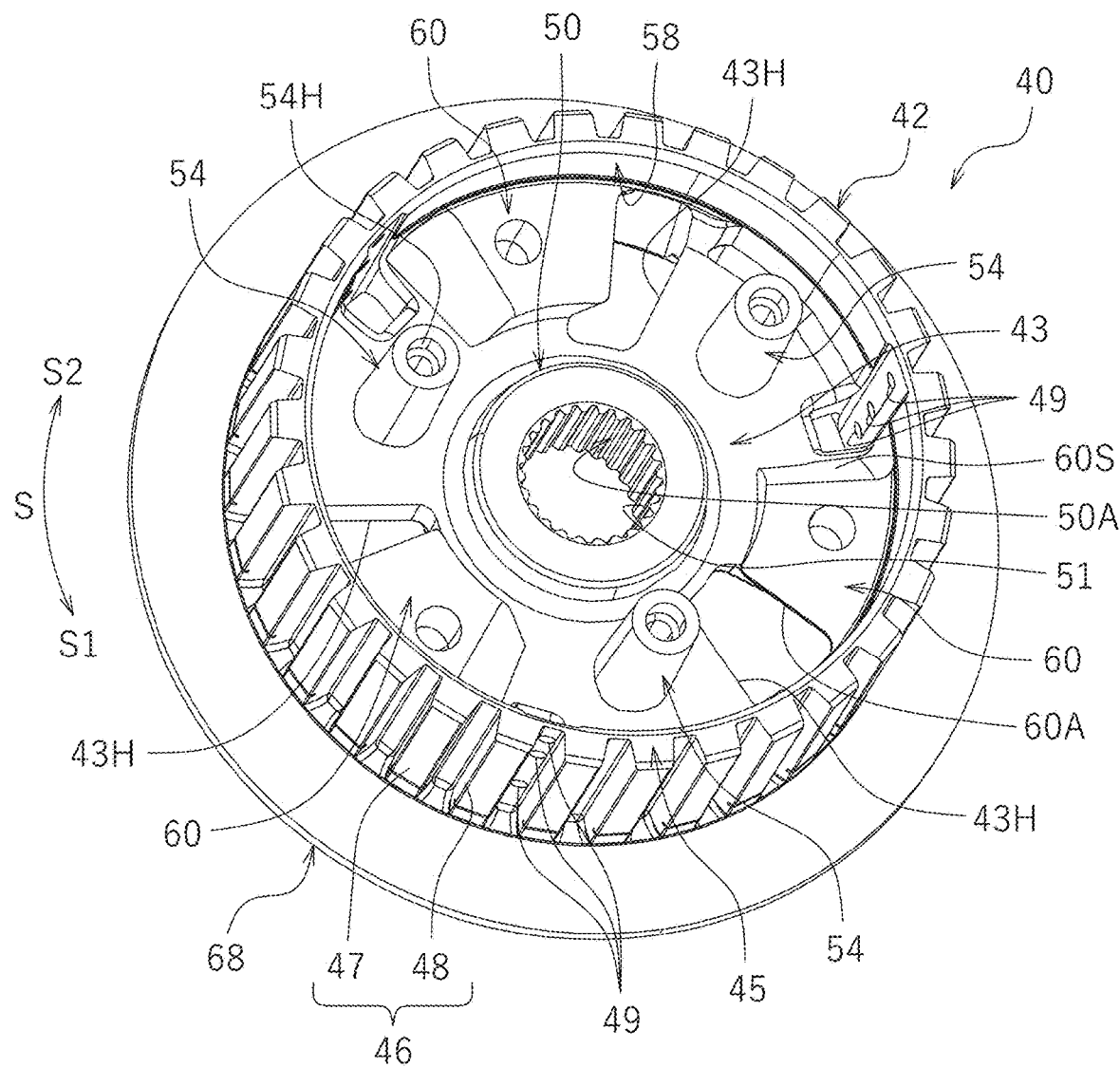
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

The output shaft holding portion 50 has a cylindrical shape. The output shaft holding portion 50 has an insertion hole 51 in which the output shaft 15 is inserted and spline-fitted. The insertion hole 51 penetrates the base wall 43. An inner peripheral surface 50A of the output shaft holding portion 50 defining the insertion hole 51 includes a plurality of spline grooves formed along the axial direction. The output shaft 15 is coupled to the output shaft holding portion 50.

As illustrated in FIG. 2, the outer peripheral wall 45 of the clutch center 40 is disposed radially outward of the output shaft holding portion 50. The outer peripheral wall 45 is formed integrally with the output shaft holding portion 50. The outer peripheral surface of the outer peripheral wall 45 includes a spline fitting portion 46. The spline fitting portion 46 includes a plurality of center-side fitting teeth 47 extending in the axial directions of the clutch center 40 along the outer peripheral surface of the outer peripheral wall 45, a plurality of spline grooves 48 each formed between adjacent ones of the center-side fitting teeth 47 and extending in the axial directions of the clutch center 40, and oil flow holes 49. The center-side fitting teeth 47 hold the output-side rotating plates 22. The plurality of center-side fitting teeth 47 arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface of the outer peripheral wall 45. The outer peripheral surfaces of the center-side fitting teeth 47 are approximately in parallel with the axis of the output shaft 15. As illustrated in FIG. 2, the oil flow holes 49 penetrate the outer peripheral wall 45 along the radial directions. Each of the oil flow holes 49 is formed between adjacent ones of the center-side fitting teeth 47. That is, the oil flow holes 49 are formed in the spline grooves 48. The oil flow holes 49 are formed at the sides of the center-side cam portions 60. More specifically, the discharge holes 49 are formed at the sides of the center-side slipper cam surfaces 60S of the center-side cam portions 60. The oil flow holes 49 are located ahead of the center-side slipper cam surface 60S in the first circumferential direction S1. The oil flow holes 49 are located ahead of bosses 54 described later in the second circumferential direction S2. The oil flow holes 49 cause the inside and outside of the clutch center 40 to communicate with each other. The oil flow holes 49 allow clutch oil that has flowed from the output shaft 15 into the clutch center 40 to be discharged to the outside of the clutch center 40.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) described later of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Figure 3:
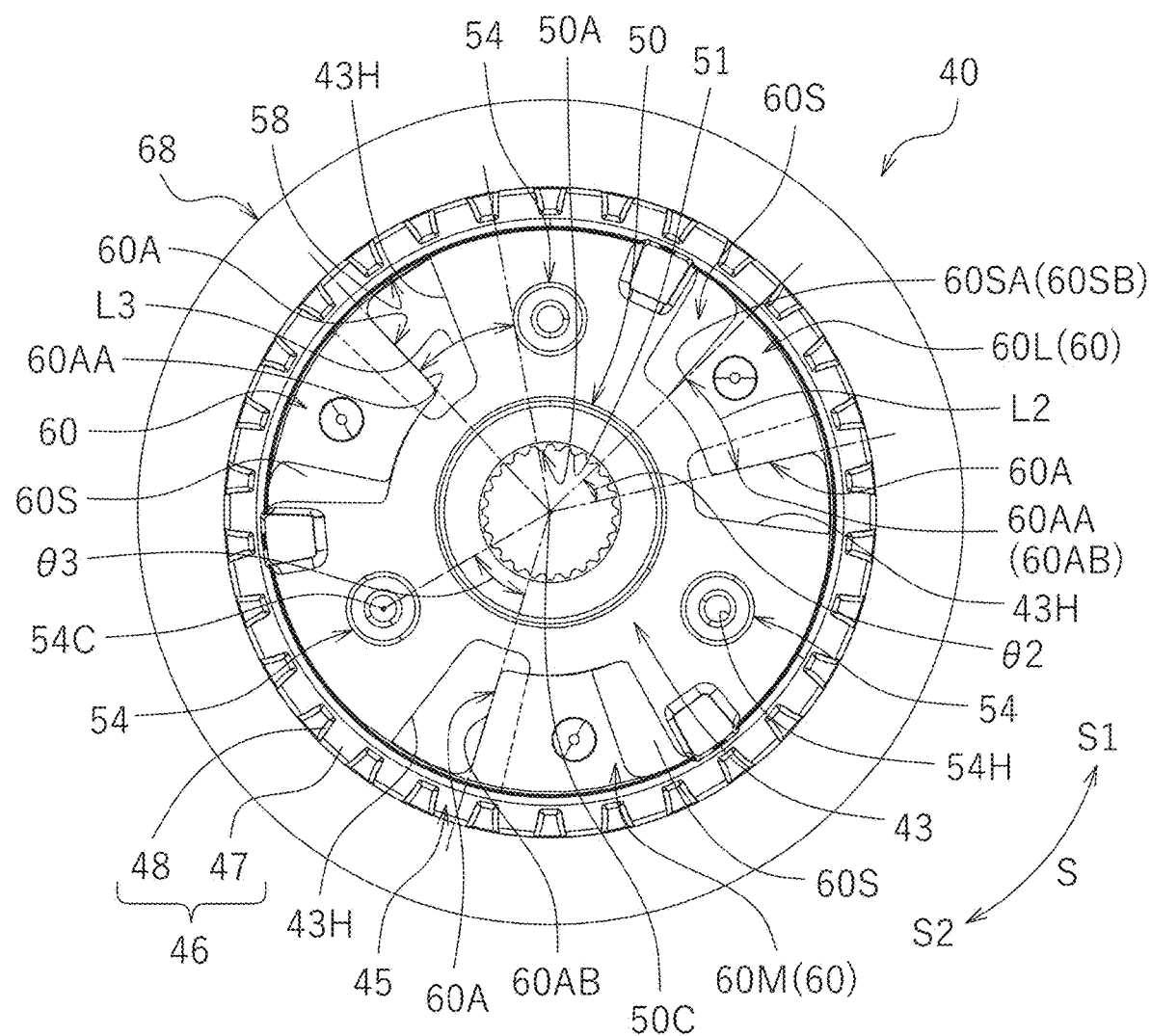
FIG. 3 is a plan view of the clutch center according to the first preferred embodiment of the present invention.

Each of the center-side cam portions 60 has a trapezoidal shape including a cam surface of a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 3, the center-side cam portions 60 are located radially outward of the output shaft holding portion 50. Each of the center-side cam portions 60 includes the center-side assist cam surface 60A and the center-side slipper cam surface 60S. The center-side assist cam surface 60A is configured to generate a force in a direction in which the pressure plate 70 approaches the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

As illustrated in FIG. 2, the clutch center 40 includes the plurality of (for example, three in this preferred embodiment) bosses 54. The bosses 54 support the pressure plate 70. The plurality of bosses 54 are arranged at regular or substantially regular intervals in the circumferential directions S. Each of the bosses 54 has a cylindrical shape. The bosses 54 are located radially outward of the output shaft holding portion 50. The bosses 54 extend toward the pressure plate 70 (i.e., in the second direction D2). The bosses 54 are disposed on the base wall 43. The bosses 54 have screw holes 54H in which bolts 28 (see FIG. 1) are inserted. The screw holes 54H extend in the axial directions of the clutch center 40.

As illustrated in FIG. 2, the center-side fitting portion 58 is located radially outward of the output shaft holding portion 50. The center-side fitting portion 58 is located radially outward of the center-side cam portions 60. The center-side fitting portion 58 is disposed ahead of the center-side cam portions 60 in the second direction D2. The center-side fitting portion 58 is formed on the inner peripheral surface of the outer peripheral wall 45. The center-side fitting portion 58 is slidably fitted onto a pressure-side fitting portion 88 (see FIG. 4) described later. The inner diameter of the center-side fitting portion 58 has a fitting tolerance allowing distribution of clutch oil flowing out of a distal end 15T of the output shaft 15 to the pressure-side fitting portion 88. That is, a gap is formed between the center-side fitting portion 58 and the pressure-side fitting portion 88 described later. In this preferred embodiment, for example, the center-side fitting portion 58 has an inner diameter larger than the outer diameter of the pressure-side fitting portion 88 by about 0.1 mm. This dimensional tolerance between the inner diameter of the center-side fitting portion 58 and the outer diameter of the pressure-side fitting portion 88 is appropriately set in accordance with the amount of clutch oil intended to be distributed, and is, for example, about 0.1 mm or more and about 0.5 mm or less.

As illustrated in FIGS. 2 and 3, the clutch center 40 includes the center-side cam holes 43H penetrating a portion of the base wall 43. The center-side cam holes 43H extend from portions on the side of the output shaft holding portion 50 to the outer peripheral wall 45. Each center-side cam hole 43H is formed between the center-side assist cam surface 60A of the center-side cam portion 60 and the boss 54. When seen in the axial direction of the clutch center 40, the center-side assist cam surface 60A overlaps with a portion of the center-side cam hole 43H.

As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The flange 98 is located at the outer diameter end of the pressure plate 70. The flange 98 is located radially outward of a cylindrical portion 80 (see FIG. 4) described later. The pressure plate 70 holds the plurality of output-side rotating plates 22 arranged alternately with the input-side rotating plates 20. The flange 98 is configured to press the input-side rotating plates 20 and the output-side rotating plates 22.

Figure 4:
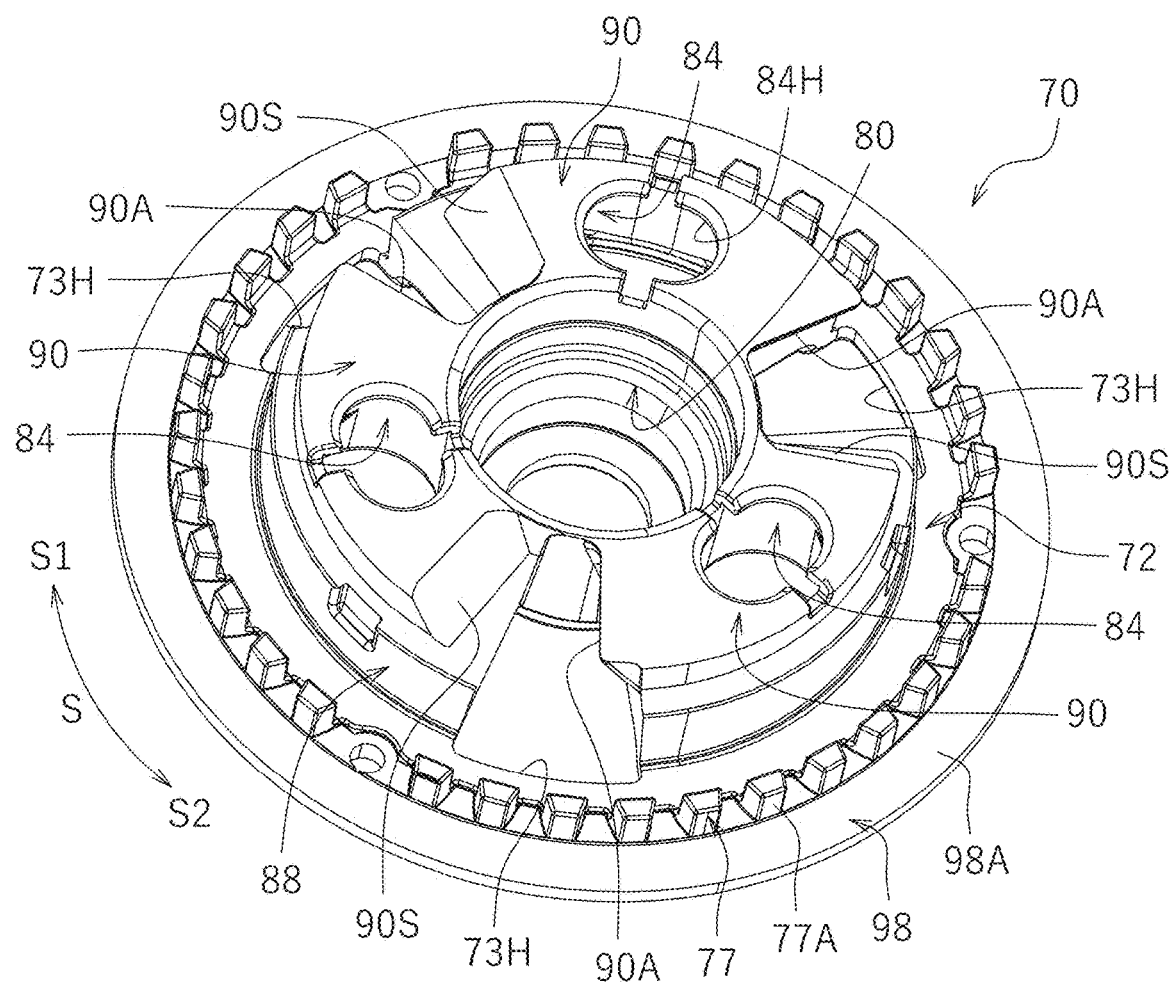
FIG. 4 is a perspective view of a pressure plate according to the first preferred embodiment of the present invention.
Figure 6:
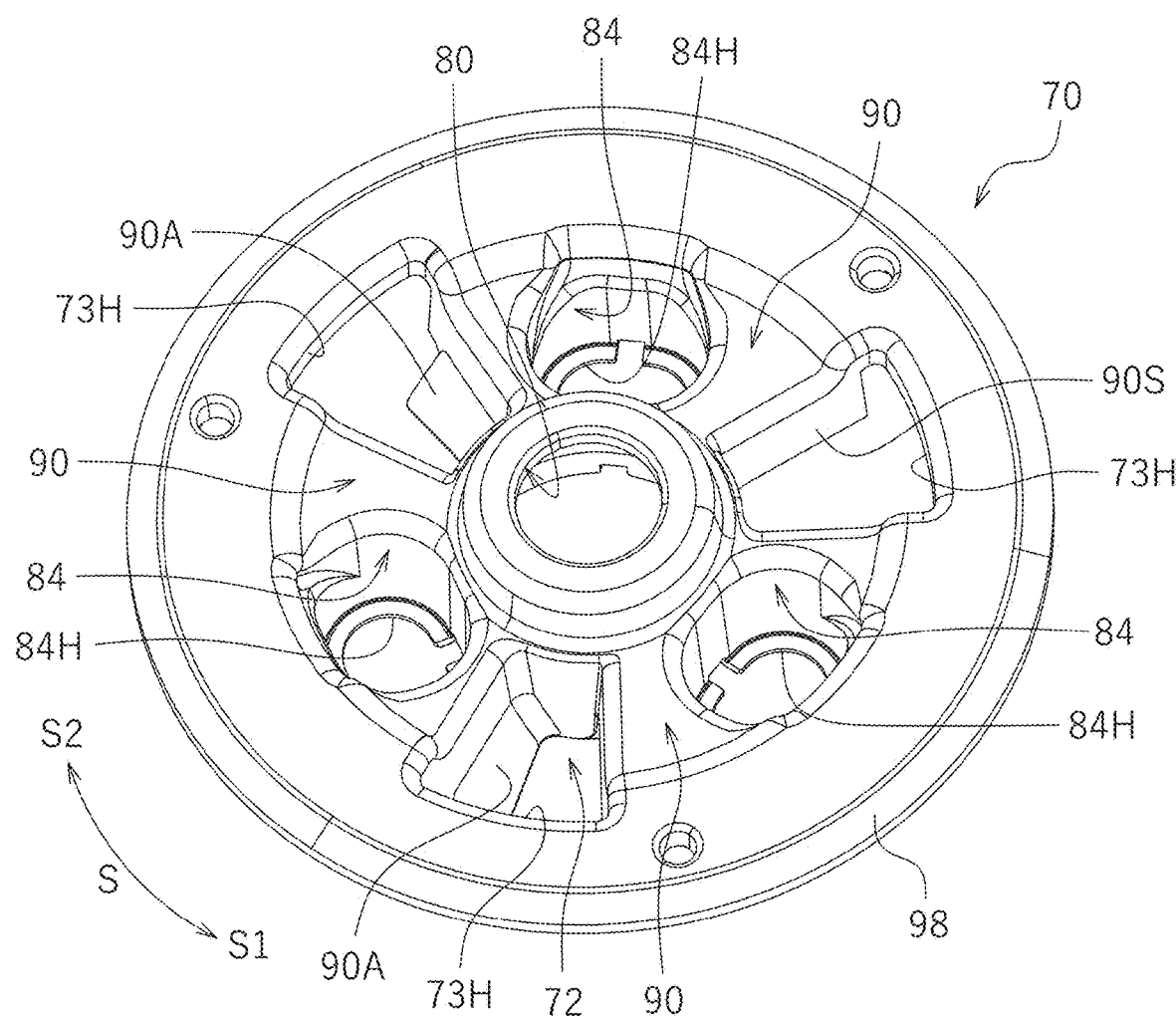
FIG. 6 is a perspective view of the pressure plate according to the first preferred embodiment of the present invention.

As illustrated in FIG. 4, the body 72 includes the cylindrical portion 80, the plurality of pressure-side cam portions 90, the pressure-side fitting portion 88, and a spring housing portion 84 (see also FIG. 6).

The cylindrical portion 80 has a cylindrical shape. The cylindrical portion 80 is integrally formed with the pressure-side cam portions 90. The cylindrical portion 80 houses the distal end 15T of the output shaft 15 (see FIG. 1). The cylindrical portion 80 houses the release bearing 18 (see FIG. 1). The cylindrical portion 80 receives a pressing force from the push member 16B. The cylindrical portion 80 receives clutch oil that has flowed out from the distal end 15T of the output shaft 15.

Figure 5A:
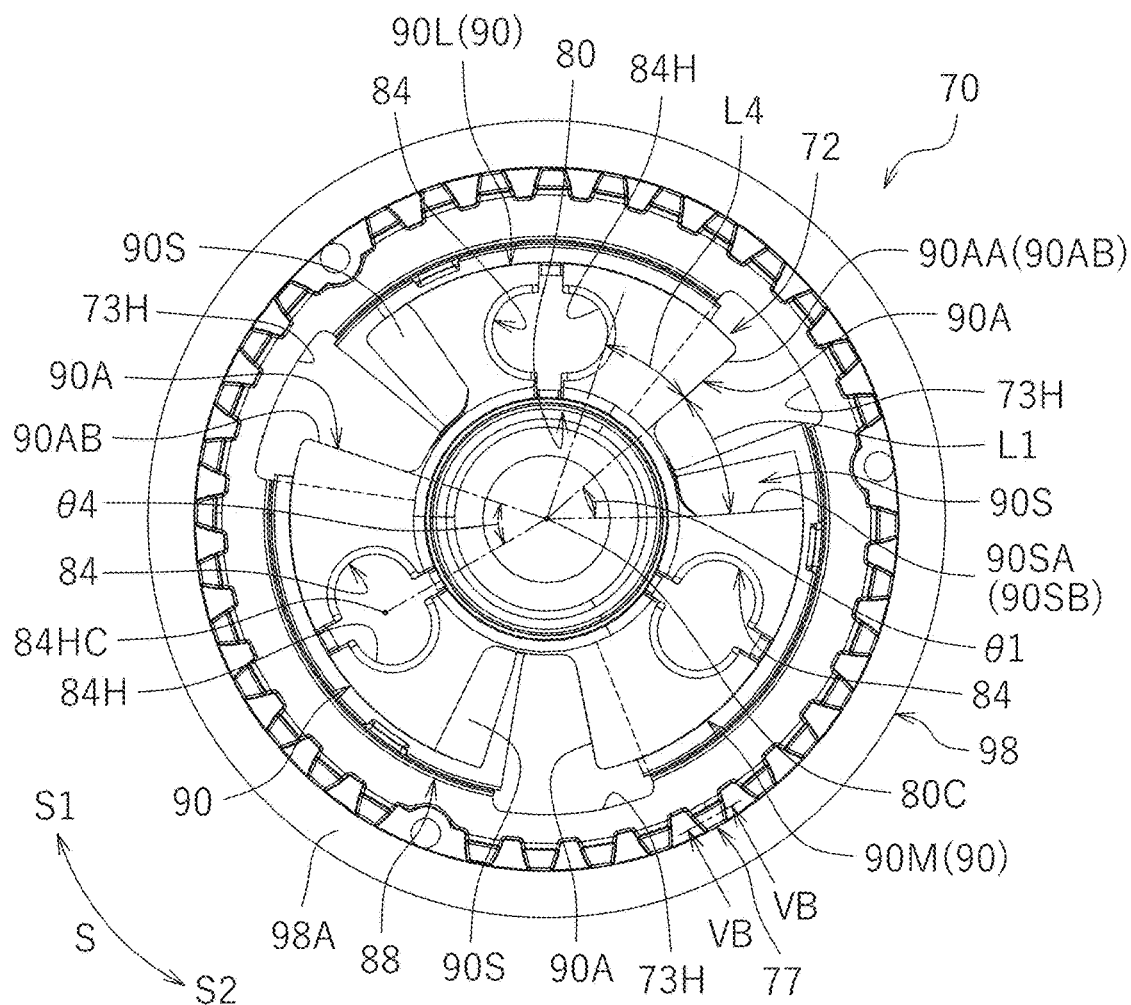
FIG. 5A is a plan view of the pressure plate according to the first preferred embodiment of the present invention.

Each of the pressure-side cam portions 90 is formed in a trapezoidal shape having a cam surface of a slope constituting an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5A, the pressure-side cam portions 90 are arranged at regular or substantially regular intervals in the circumferential directions S of the pressure plate 70. In this preferred embodiment, the pressure plate 70 includes three pressure-side cam portions 90, but the number of the pressure-side cam portions 90 is not limited to three.

Figure 9:
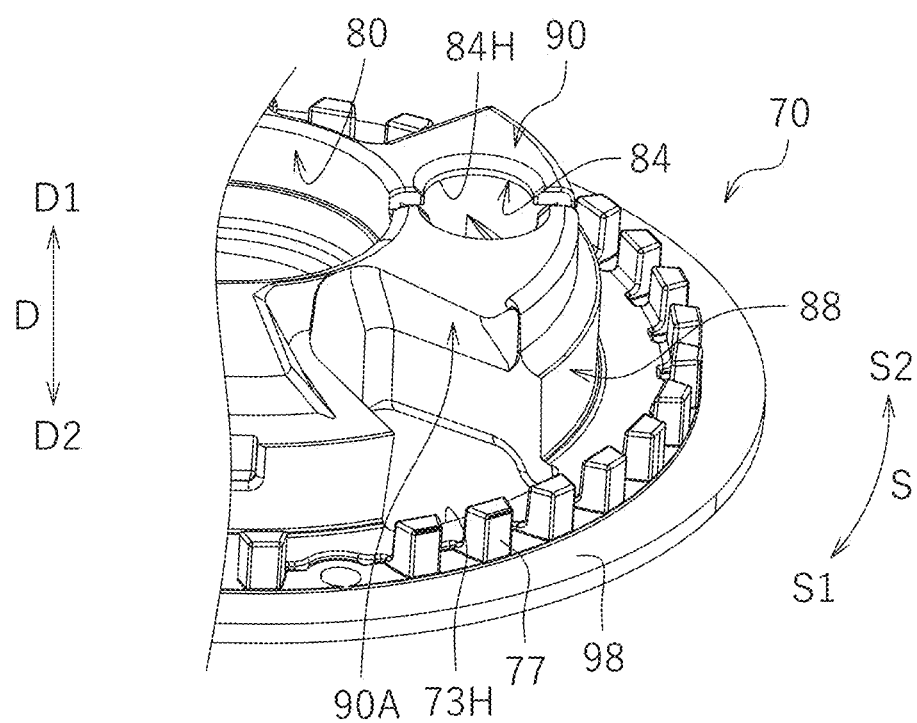
FIG. 9 is an enlarged perspective view of a portion of the pressure plate according to the first preferred embodiment of the present invention.

As illustrated in FIG. 5A, the pressure-side cam portion 90 is located radially outward of the cylindrical portion 80. Each of the pressure-side cam portions 90 includes a pressure-side assist cam surface 90A (see also FIGS. 7 and 9) and a pressure-side slipper cam surface 90S. The pressure-side assist cam surface 90A can be brought into contact with the center-side assist cam surface 60A. The pressure-side assist cam surface 90A is configured to generate a force in a direction in which the pressure plate 70 approaches the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 8:
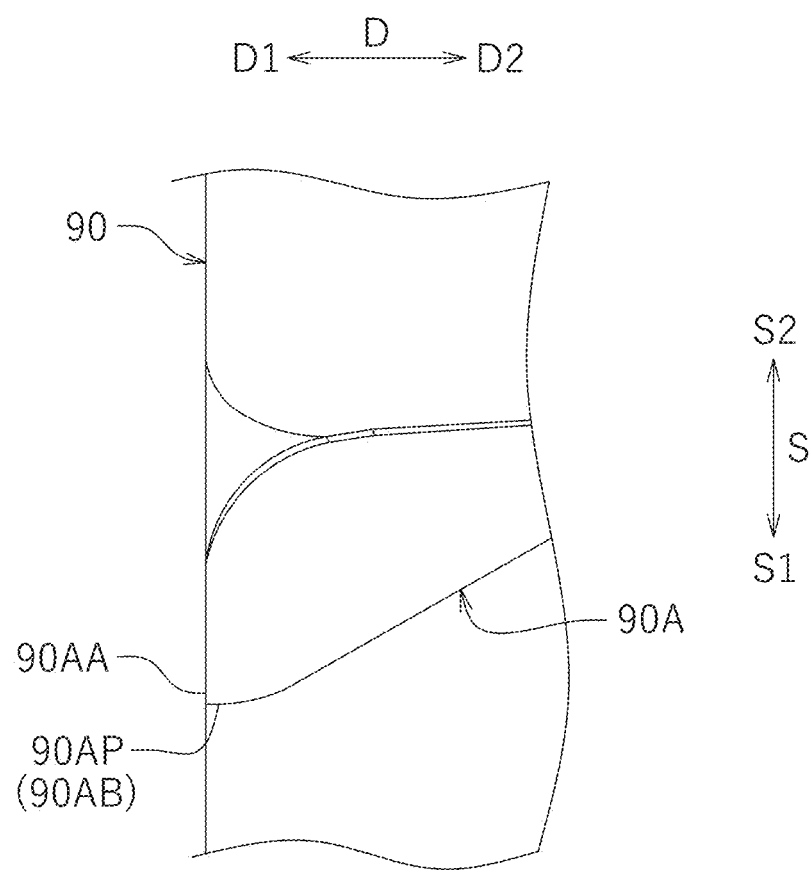
FIG. 8 is an enlarged side view of a portion of a pressure-side cam portion according to the first preferred embodiment of the present invention.

As illustrated in FIG. 8, an end of the pressure-side assist cam surface 90A of each pressure-side cam portion 90 in the circumferential directions S includes a chamfered portion 90AP that is linearly chamfered. A corner of the chamfered portion 90AP (corner on the side of the first direction D1 and the first circumferential direction S1) includes a right angle. More specifically, the chamfered portion 90AP is formed in an end 90AB of the pressure-side assist cam surface 90A in the first circumferential direction S1.

Figure 11A:
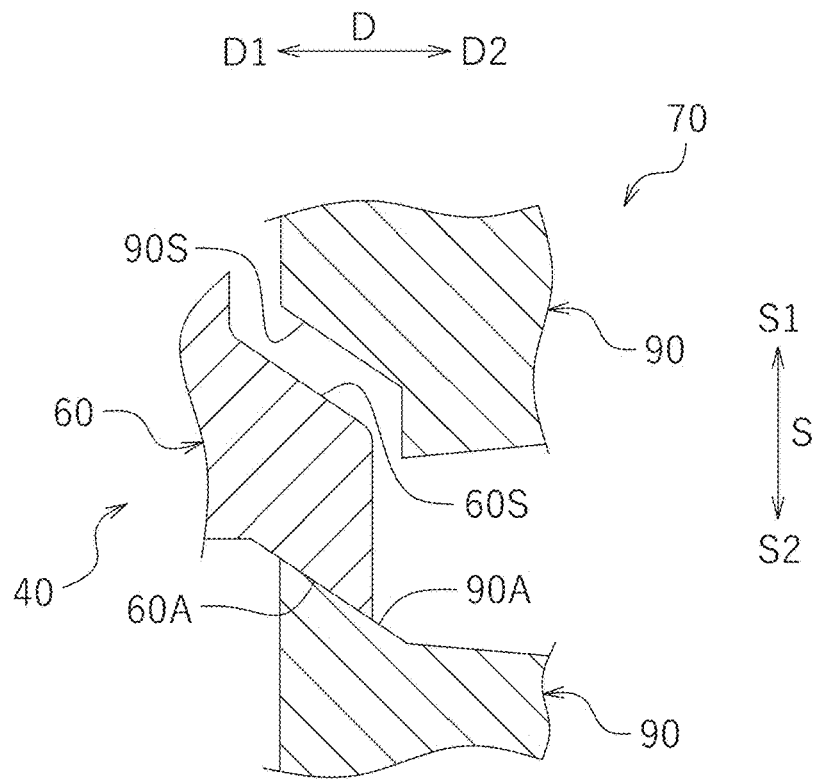
FIG. 11A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is thereby allowed to be transferred to the output shaft 15 through the clutch center 40, a rotation force in the first circumferential direction S1 is applied to the pressure plate 70, as illustrated in FIG. 11A. Thus, with the effects of the center-side assist cam surface 60A and the pressure-side assist cam surface 90A, a force in first direction D1 is generated in the pressure plate 70. Accordingly, the pressure plate 70 further moves in the direction toward the clutch center 40 (first direction D1) to increase a pressure contact force between the input-side rotating plates 20 and the output-side rotating plates 22.

Figure 11B:
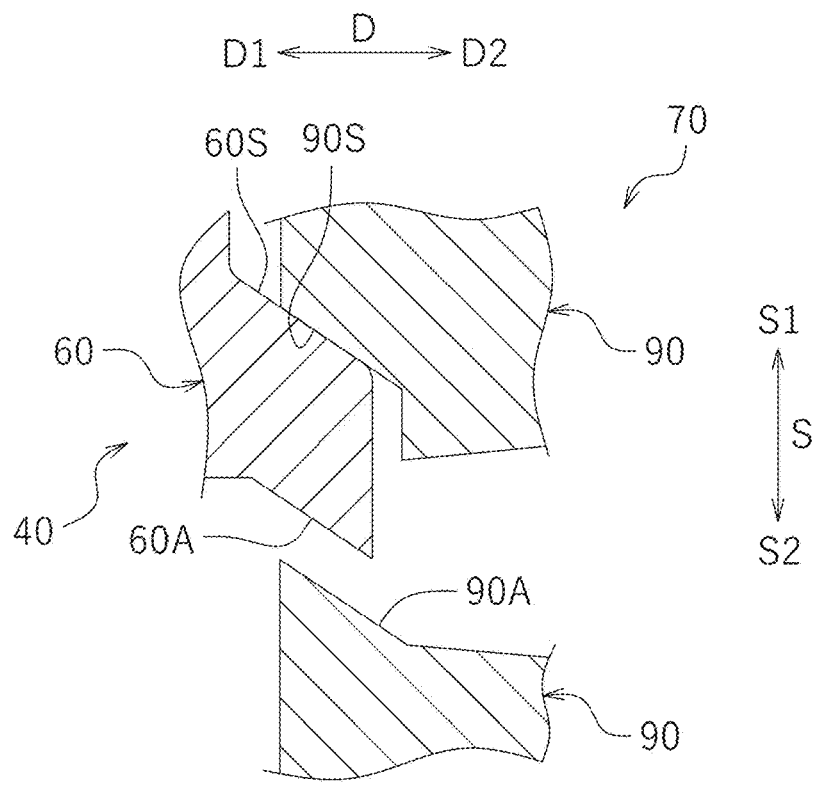
FIG. 11B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 11B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

As illustrated in FIG. 4, the pressure-side fitting portion 88 is located radially outside of the pressure-side cam portions 90. The pressure-side fitting portion 88 is located ahead of the pressure-side cam portions 90 in the second direction D2. The pressure-side fitting portion 88 is configured to slidably fit in the center-side fitting portion 58 (see FIG. 2).

Figure 7:
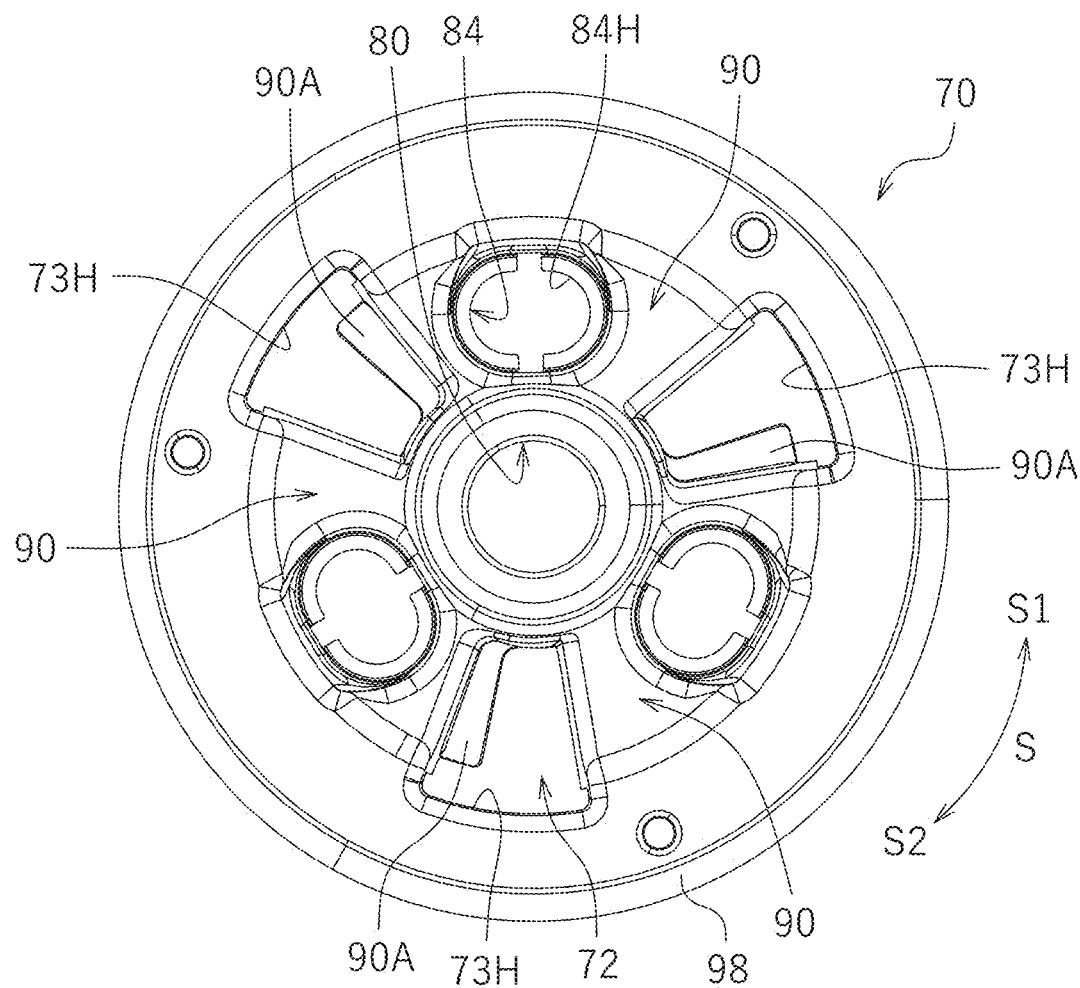
FIG. 7 is a plan view of the pressure plate according to the first preferred embodiment of the present invention.

As illustrated in FIGS. 4 and 5A, the pressure plate 70 includes pressure-side cam holes 73H penetrating the body 72 and a portion of the flange 98. The pressure-side cam holes 73H are located radially outward of the cylindrical portion 80. The pressure-side cam holes 73H extend from portions on the side of the cylindrical portion 80 to the radially outside of the pressure-side fitting portion 88. Each of the pressure-side cam holes 73H is formed between the pressure-side assist cam surface 90A and the pressure-side slipper cam surface 90S of adjacent ones of the pressure-side cam portions 90. As illustrated in FIGS. 5A and 7, when seen in the axial direction of the pressure plate 70, the pressure-side assist cam surface 90A overlaps with portions of the pressure-side cam holes 73H.

Figure 5B:
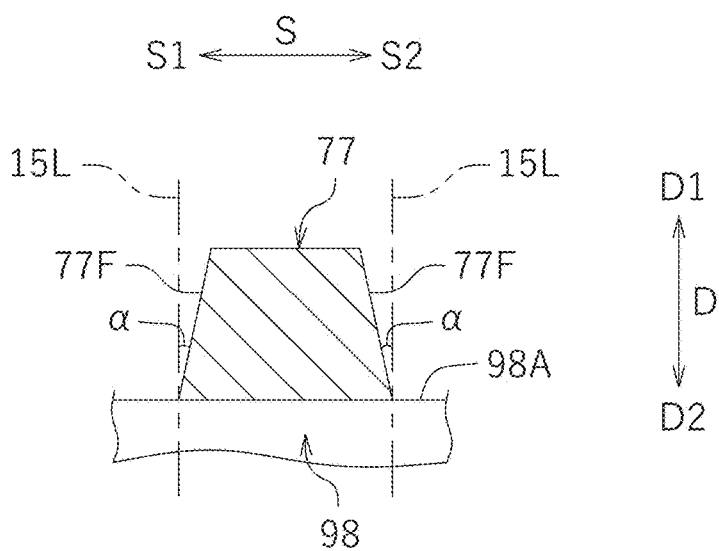
FIG. 5B is a cross-sectional view taken along line VB-VB in FIG. 5A.
Figure 13:
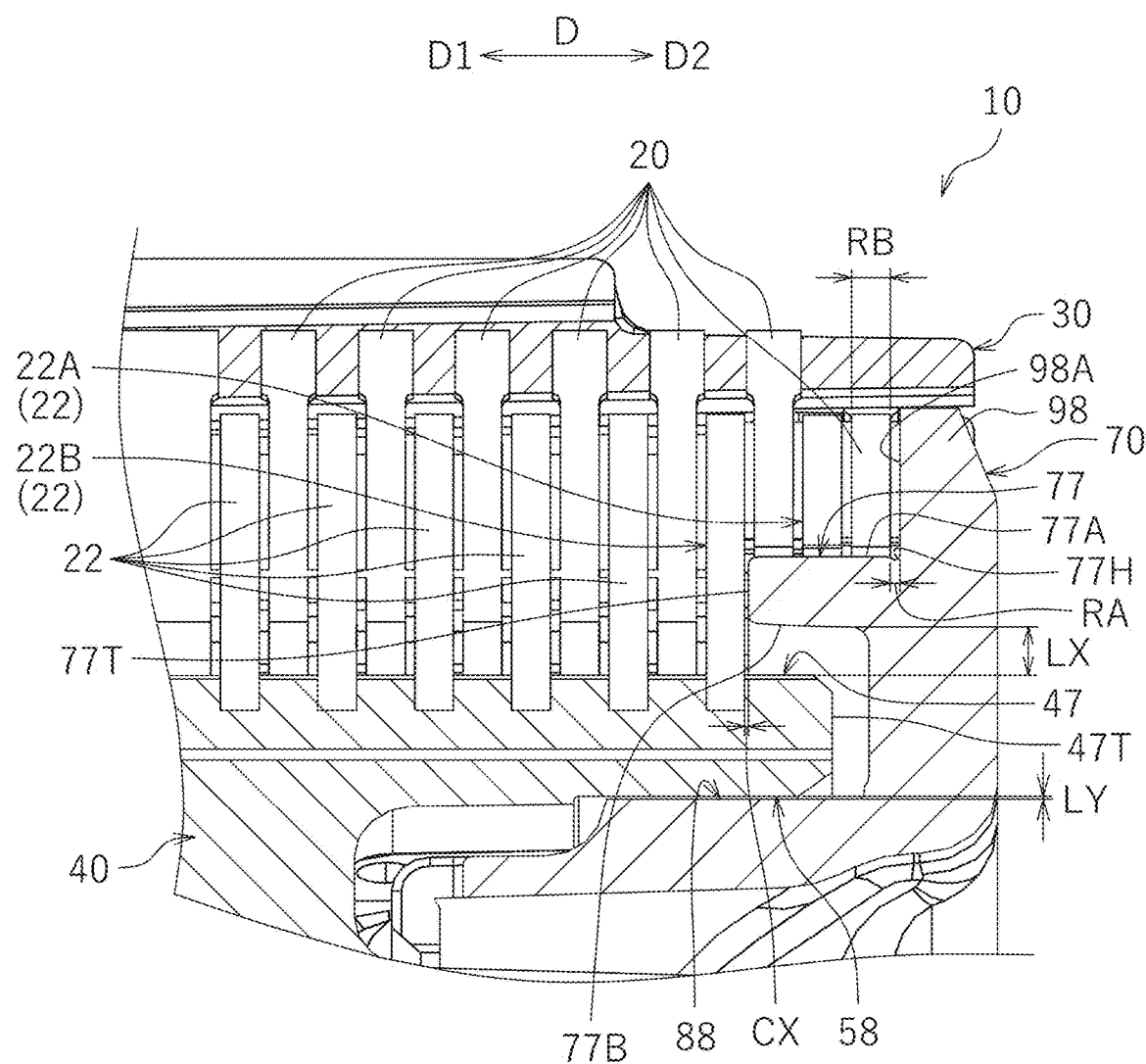
FIG. 13 is a partially enlarged cross-sectional view showing a positional relationship between the clutch center and the pressure plate in a normal state.

As illustrated in FIG. 4, the pressure plate 70 includes the plurality of pressure-side fitting teeth 77 arranged on the surface 98A of the flange 98 facing in the first direction. The pressure-side fitting teeth 77 hold at least one of the output-side rotating plates 22. The input-side rotating plates 20 and the output-side rotating plates 22 are movable in the directions D along outer peripheral surfaces 77A of the pressure-side fitting teeth 77 (see also FIG. 13). The pressure-side fitting teeth 77 project in the first direction D1 from the surface 98A of the flange 98 facing in the first direction. The pressure-side fitting teeth 77 are located radially outward of the cylindrical portion 80. The pressure-side fitting teeth 77 are located radially outward of the pressure-side cam portions 90. The pressure-side fitting teeth 77 are located radially outward of the pressure-side fitting portion 88. The plurality of pressure-side fitting teeth 77 are arranged in the circumferential directions S. The plurality of pressure-side fitting teeth 77 are arranged at regular or substantially regular intervals in the circumferential directions S. As illustrated in FIG. 13, a recess 77H that is recessed radially inward is formed at each end of the outer peripheral surfaces 77A of the pressure-side fitting teeth 77 in the second direction D2. The recess 77H is formed along the entire circumference of each end of the outer peripheral surfaces 77A of the pressure-side fitting teeth 77 in the second direction D2. A length RA of the recess 77H in the directions D is smaller than a length RB of one input-side rotating plate 20 in the directions D. Inner peripheral surfaces 77B of the pressure-side fitting teeth 77 tilt radially outward in the first direction D1. The inner peripheral surfaces 77B of the pressure-side fitting teeth 77 tilt by, for example, about 2° with respect to the output shaft 15 such that the inner peripheral surfaces 77B gradually approach the radially outer side in the first direction D1. A tilt angle of the inner peripheral surfaces 77B is larger than a tilt angle of other portions, such as the outer peripheral surfaces 77A of the pressure-side fitting teeth 77. The outer peripheral surfaces 77A of the pressure-side fitting teeth 77 tilt radially outward in the second direction D2. The outer peripheral surfaces 77A of the pressure-side fitting teeth 77 tilt by, for example, about 1° with respect to the output shaft 15 such that the outer peripheral surfaces 77A gradually approach the radially outer side in the second direction D2. As illustrated in FIG. 5B, a pair of side surfaces 77F of each of the pressure-side fitting teeth 77 in the circumferential directions S tilt to approach each other in the first direction D1 when seen in the radial directions of the output shaft 15. An angle α defined by each side surface 77F and a line 15L parallel to the axis of the output shaft 15 is, for example, larger than about 0° and smaller than about 5° (e.g., larger than about 0° and smaller than about 1°). In this preferred embodiment, since a portion of the pressure-side fitting teeth 77 has been removed, the interval of this portion is enlarged, but the other adjacent pressure-side fitting teeth 77 are arranged at regular or substantially regular intervals.

Figure 14A:
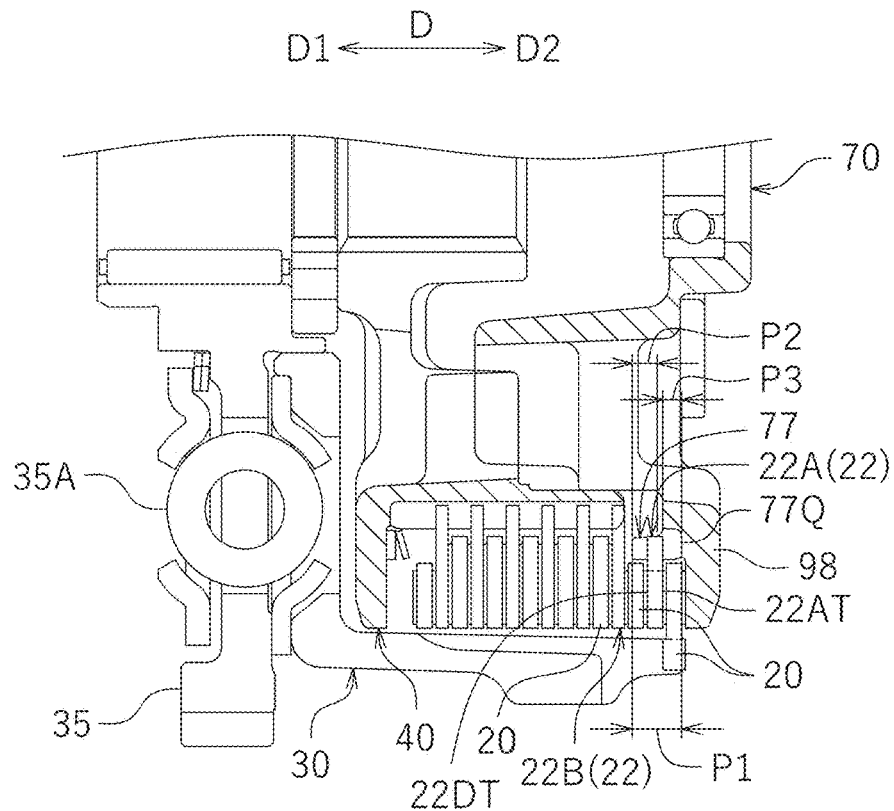
FIG. 14A is a cross-sectional view showing a positional relationship between the clutch center and the pressure plate in the normal state.
Figure 14B:
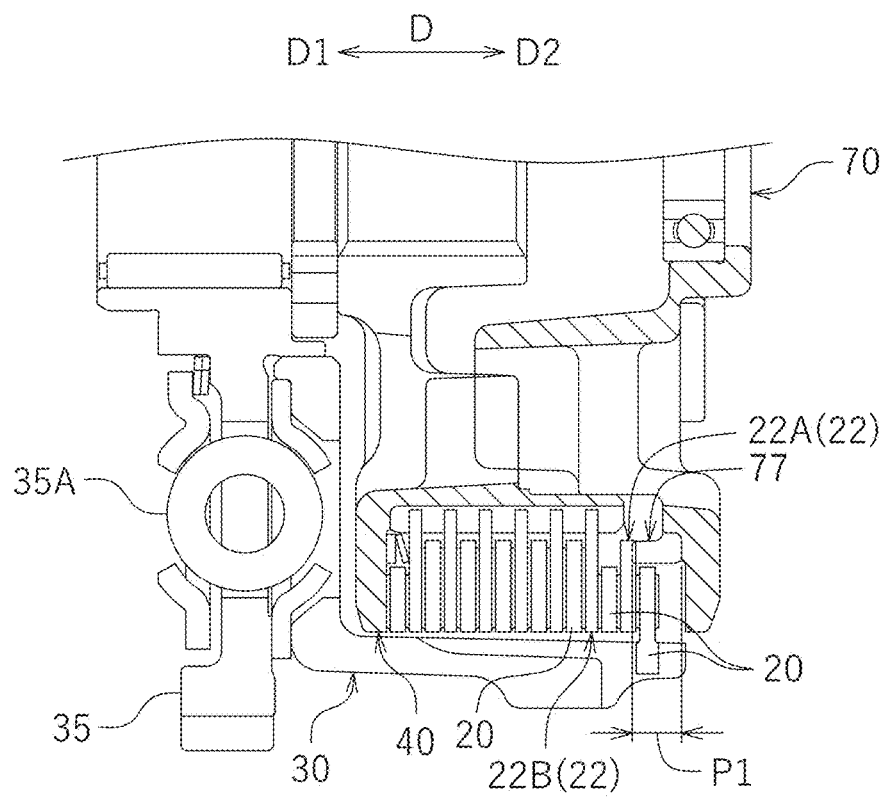
FIG. 14B is a cross-sectional view showing a positional relationship between the clutch center and the pressure plate when the pressure plate is farthest from the clutch center.

As illustrated in FIG. 14A, a length P1 of each of the pressure-side fitting teeth 77 in the directions D is larger than a total distance (P2+P3) of the sum of a maximum movement distance P2 of the pressure plate 70 in the directions D and a rotating plate distance P3 that is a distance from an end 22AT of a pressure-side outermost output-side rotating plate 22A, which is one of the output-side rotating plates 22 held by the pressure-side fitting teeth 77 located at the front in the first direction D1, in the second direction D2 to an end 77Q (boundary with the flange 98) of the pressure-side fitting tooth 77 in the second direction D2. That is, P1>(P2+P3) is established. The normal state means that the pressure plate 70 is closest to the clutch center 40. The normal state herein refers to a state where the clutch is engaged (hereinafter referred to as a clutch ON state). Thus, as illustrated in FIG. 14B, when the pressure plate 70 moves from the normal state in the second direction D2 by the maximum movement distance P2, the pressure-side outermost output-side rotating plate 22A overlaps with a portion of the pressure-side fitting teeth 77, and the pressure-side outermost output-side rotating plate 22A is held by the pressure-side fitting teeth 77. That is, the pressure-side fitting teeth 77 always hold the pressure-side outermost output-side rotating plate 22A, and has the length P1 enough to prevent the pressure-side outermost output-side rotating plate 22A from dropping off. The rotating plate distance P3 may be a distance in the normal state from an end 22DT of the pressure-side outermost output-side rotating plate 22A in the first direction D1 to the end 77Q (boundary with the flange 98) of the pressure-side fitting tooth 77 in the second direction D2. When the pressure plate 70 moves from the normal state in the second direction D2 by the maximum movement distance P2, the pressure plate 70 is brought into contact with the stopper plate 100 (see FIG. 1). As illustrated in FIG. 14B, while the pressure plate 70 is farthest from the clutch center 40, the input-side rotating plates 20 located ahead of the pressure-side outermost output-side rotating plate 22A in the first direction D1 do not overlap with the ends 77T of the pressure-side fitting teeth 77 in the first direction D1 when seen in the radial directions of the output shaft 15. That is, while the pressure plate 70 is farthest from the clutch center 40, a member located at the front in the pressure-side fitting teeth 77 in the first direction D1 is the pressure-side outermost output-side rotating plate 22A. In this preferred embodiment, in attaching the pressure plate 70 to the clutch center 40 with the output-side rotating plates 22 held by the pressure-side fitting teeth 77, since the output-side rotating plates 22 are held by the distal ends (i.e., the ends 77T in the first direction D1) of the pressure-side fitting teeth 77, the output-side rotating plates 22 do not fall off from the pressure-side fitting teeth 77. Accordingly, the pressure plate 70 is easily attached to the clutch center 40. In addition, while the pressure plate 70 is farthest from the clutch center 40 (e.g., the pressure plate 70 is in contact with the stopper plate 100, hereinafter referred to as an over-lift state), the input-side rotating plates 20 located ahead of the pressure-side outermost output-side rotating plate 22A in the first direction D1 do not overlap with the pressure-side fitting teeth 77 (i.e., the pressure-side fitting teeth 77 are short enough to avoid overlapping) when seen in the radial directions of the output shaft 15. Thus, it is possible to prevent collision of the ends 77T of the pressure-side fitting teeth 77 in the first direction D1 against the input-side rotating plates 20 held by the clutch center 40 when the clutch is engaged. Furthermore, since the pressure-side outermost output-side rotating plate 22A can be always held by the pressure-side fitting teeth 77 independently of the position of the pressure plate 70 with a compact size (i.e., short length) of the pressure-side fitting teeth 77, it is possible to prevent the pressure-side outermost output-side rotating plate 22A from dropping off from the pressure-side fitting teeth 77. On the other hand, in the over-lift state, if the input-side rotating plates 20 located ahead of the pressure-side outermost output-side rotating plate 22A in the first direction D1 overlap with the pressure-side fitting teeth 77 (i.e., the pressure-side fitting teeth 77 are long to allow overlapping) when seen in the radial directions of the output shaft 15, the ends 77T of the pressure-side fitting teeth 77 in the first direction D1 might collide with the input-side rotating plates 20 held by the clutch center 40 when the clutch is engaged.

Figure 12:
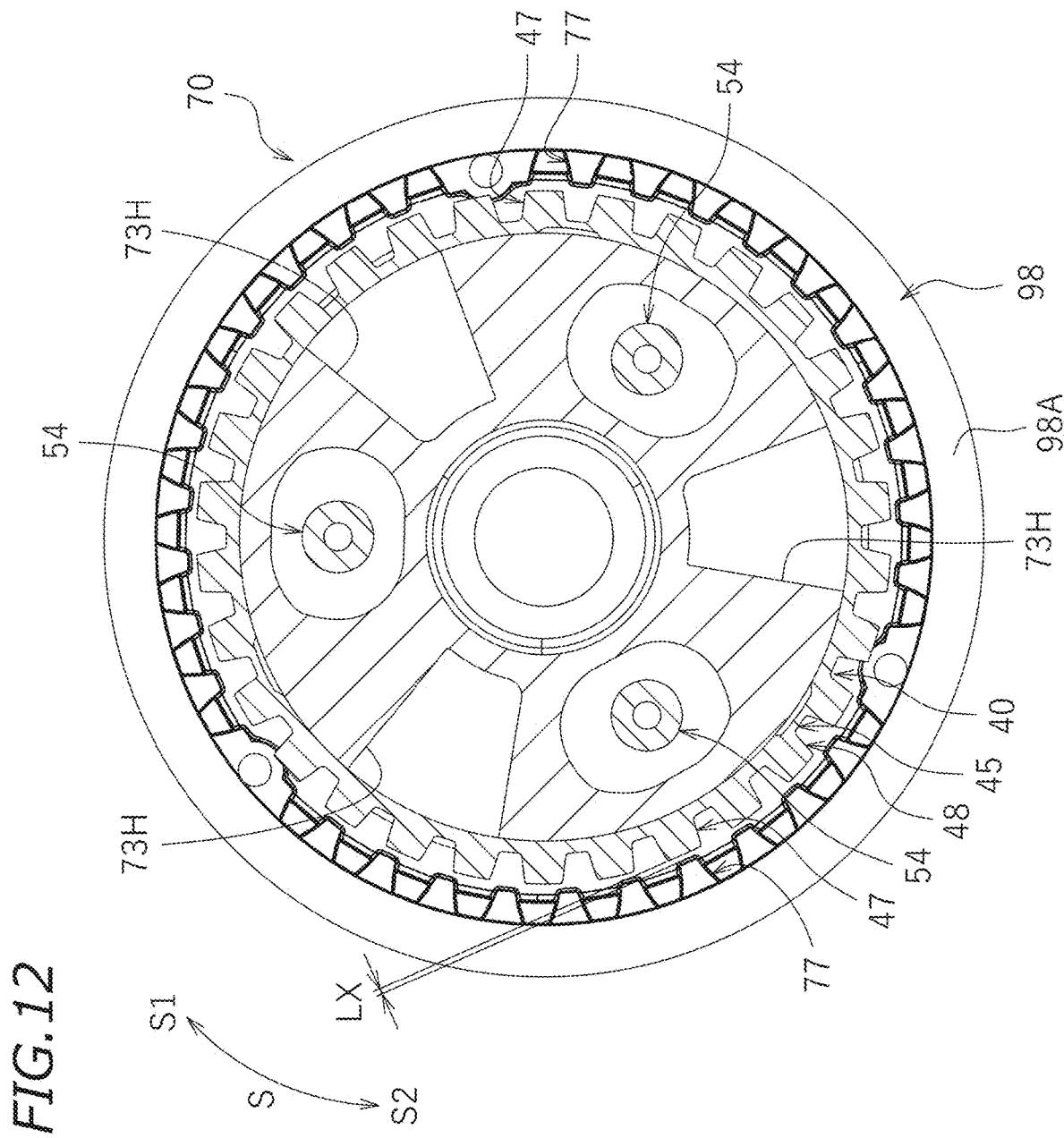
FIG. 12 is a cross-sectional view of the clutch center and the pressure plate according to the first preferred embodiment of the present invention.

As illustrated in FIG. 12, the pressure-side fitting teeth 77 are located radially outward of the center-side fitting teeth 47. A gap is formed between the pressure-side fitting teeth 77 and the center-side fitting teeth 47 in the radial directions. As illustrated in FIG. 13, ends 77T of the pressure-side fitting teeth 77 in the first direction D1 are located ahead, in the first direction D1, of ends 47T of the center-side fitting teeth 47 in the second direction D2. A distance LX between the pressure-side fitting teeth 77 and the center-side fitting teeth 47 in the radial directions is longer than a distance LY between the pressure-side fitting portion 88 and the center-side fitting portion 58 in the radial directions. As described above, since the inner peripheral surfaces 77B of the pressure-side fitting teeth 77 tilt radially outward in the first direction D1 and the outer peripheral surfaces of the center-side fitting teeth 47 are substantially in parallel with the axis of the output shaft 15, the distance LX gradually increases in the first direction D1. Accordingly, while the pressure plate 70 and the clutch center 40 rotate, clutch oil held in space between the pressure-side fitting teeth 77 and the center-side fitting teeth 47 is easily spattered to the output-side rotating plates 22 and the input-side rotating plates 20 from wide openings between the ends 77T of the pressure-side fitting teeth 77 in the first direction D1 and the center-side fitting teeth 47 so that lubricity between the output-side rotating plates 22 and the input-side rotating plates 20 increases. The distance LX is a shortest distance of the distances between the pressure-side fitting teeth 77 and the center-side fitting teeth 47 in the radial directions. In the normal state, a gap CX is formed between the ends 77T of the pressure-side fitting teeth 77 in the first direction D1 and a center-side outermost output-side rotating plate 22B, which is one of the output-side rotating plates 22 held by the clutch center 40 located at the front in the second direction D2. That is, the pressure-side fitting teeth 77 are not in contact with the center-side outermost output-side rotating plate 22B.

As illustrated in FIGS. 6 and 7, the spring housing portions 84 are formed in the pressure-side cam portions 90. The spring housing portions 84 are recessed from the second direction D2 to the first direction D1. Each of the spring housing portions 84 has an oval shape. The spring housing portions 84 house pressure springs 25 (see FIG. 1). The spring housing portions 84 include the insertion holes 84H which penetrate the spring housing portions 84 and in which the bosses 54 (see FIG. 2) are inserted. That is, the insertion holes 84H penetrate the pressure-side cam portions 90. Each of the insertion holes 84H has an oval shape.

As illustrated in FIG. 1, the pressure springs 25 are housed in the spring housing portions 84. The pressure springs 25 are held by the bosses 54 inserted in the insertion holes 84H of the spring housing portions 84. The pressure springs 25 bias the pressure plate 70 toward the clutch center 40 (i.e., in the first direction D1). The pressure springs 25 are, for example, coil springs obtained by helically winding spring steel.

Figure 10:
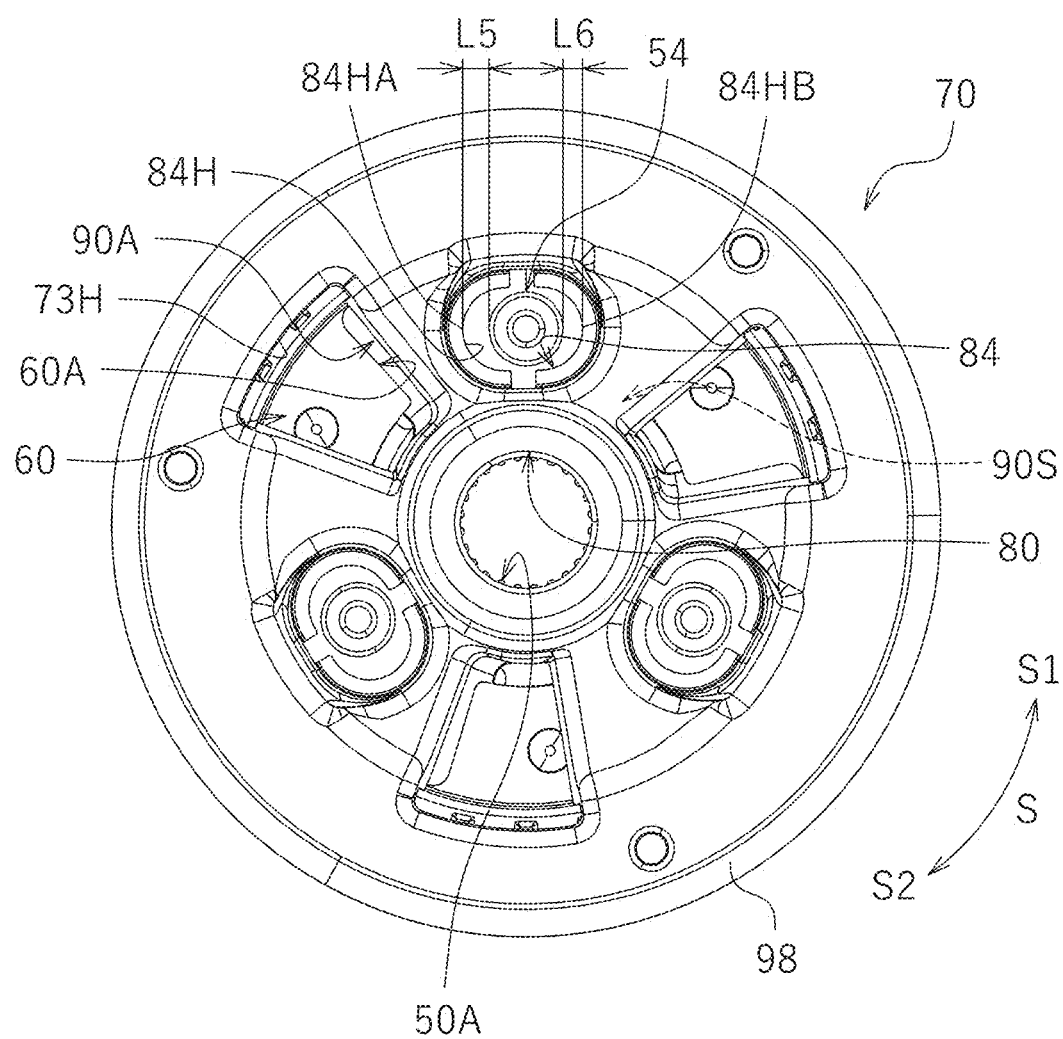
FIG. 10 is a plan view illustrating a state where the clutch center and the pressure plate according to the first preferred embodiment of the present invention are combined.

FIG. 10 is a plan view illustrating a state where the clutch center 40 and the pressure plate 70 are combined. In the state illustrated in FIG. 10, the pressure-side assist cam surface 90A and the center-side assist cam surface 60A do not contact each other, and the pressure-side slipper cam surface 90S and the center-side slipper cam surface 60S do not contact each other. At this time, the pressure plate 70 is closest to the clutch center 40. This state will be referred to as a normal state of the clutch device 10. As illustrated in FIG. 10, a distance L5 in the circumferential directions S between the boss 54 and an end 84HA of the insertion holes 84H toward the pressure-side assist cam surface 90A (i.e., ahead in the first circumferential direction S1) in the normal state is smaller than a distance L6 in the circumferential direction S between the boss 54 and an end 84HB of the insertion holes 84H toward the pressure-side slipper cam surface 90S (i.e., ahead in the second circumferential direction S2) in the normal state.

As illustrated in FIG. 1, the stopper plate 100 can contact the pressure plate 70. The stopper plate 100 reduces or prevents separation of the pressure plate 70 from the clutch center 40 by a predetermined distance or more in the second direction D2. The stopper plate 100 is fixed to the bosses 54 of the clutch center 40 with the bolts 28. The pressure plate 70 is fixed by fastening the bolts 28 to the bosses 54 through the stopper plate 100 with the bosses 54 and the pressure springs 25 of the clutch center 40 disposed in the spring housing portions 84. The stopper plate 100 is substantially triangular in plan view.

When the pressure plate 70 is brought into contact with the stopper plate 100, the pressure-side slipper cam surface 90S and the center-side slipper cam surface 60S are in contact with each other in an area of about 50% or more and about 90% or less of the area of the pressure-side slipper cam surface 90S and about 50% or more and about 90% or less of the area of the center-side slipper cam surface 60S, for example. When the pressure plate 70 is brought into contact with the stopper plate 100, the pressure springs 25 are separated from the side walls of the spring housing portions 84. That is, the pressure springs 25 are not sandwiched between the bosses 54 and the spring housing portions 84, and application of excessive stress to the bosses 54 is suppressed.

Here, a length L1 in the circumferential directions S (see FIG. 5A) from the end 90AA of the pressure-side assist cam surface 90A in the first direction D1 of one pressure-side cam portion 90L located on the side of the first circumferential direction S1 in the pressure-side cam portions 90 adjacent to each other in the circumferential directions S to an end 90SA of the pressure-side slipper cam surface 90S in the first direction D1 of the other pressure-side cam portion 90M located on the side of the second circumferential direction S2 is larger than a length L2 in the circumferential directions (see FIG. 3) from an end 60AA of the center-side assist cam surface 60A in the second direction D2 to the end 60SA of the center-side slipper cam surface 60S in the second direction D2 in one center-side cam portion 60.

When seen in the axial directions of the output shaft 15, an angle θ1 (see FIG. 5A) defined by a center 80C of the cylindrical portion 80, the end 90AB of the pressure-side assist cam surface 90A in the first circumferential direction S1 located on the side of the first circumferential direction S1 of one pressure-side cam portion 90L in the pressure-side cam portions 90 adjacent to each other in the circumferential directions S, and the end 90SB of the pressure-side slipper cam surface 90S in the first circumferential direction S1 located on the side of the second circumferential direction S2 of the other pressure-side cam portion 90M is larger than an angle θ2 (see FIG. 3) defined by a center 50C of the output shaft holding portion 50, the end 60AB of the center-side assist cam surface 60A in the second circumferential direction S2, and the end 60SB of the center-side slipper cam surface 60S in the second circumferential direction S2 in one center-side cam portion 60.

A length L3 in the circumferential directions S (see FIG. 3) from the end 60AA of the center-side assist cam surface 60A in the second direction D2 to the boss 54 is larger than a length L4 in the circumferential directions S (see FIG. 5A) from the end 90AA of the pressure-side assist cam surface 90A in the first direction D1 to the insertion hole 84H.

When seen in the axial directions of the output shaft 15, an angle θ3 (see FIG. 3) defined by the center 50C of the output shaft holding portion 50, the end 60AB in the second circumferential direction S2 of the center-side assist cam surface 60A of the center-side cam portion 60, and a center 54C of the boss 54 is larger than an angle θ4 (see FIG. 5A) defined by the center 80C of the cylindrical portion 80, the end 90AB of the pressure-side assist cam surface 90A in the first circumferential direction S1, and a center 84HC of the insertion hole 84H.

The clutch device 10 is filled with a predetermined amount of clutch oil. Clutch oil is distributed in the clutch center 40 and the pressure plate 70 through the hollow portion 15H of the output shaft 15, and then is supplied to the input-side rotating plates 20 and the output-side rotating plates 22 through the gap between the center-side fitting portion 58 and the pressure-side fitting portion 88 and the oil flow holes 49. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's clutch operation (e.g., driver's operation of a clutch operation lever or an operation button).

In the clutch device 10, in a case where the driver of the motorcycle does not perform clutch operation (e.g., a case where the driver does not operate a clutch operation lever), a clutch release mechanism (not shown) does not press the push rod 16A, and thus, the pressure plate 70 presses the input-side rotating plates 20 with a biasing force (elastic force) of the pressure springs 25. Accordingly, the clutch center 40 enters a clutch-ON state (i.e., clutch engaged state) in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, clutch oil distributed in the hollow portion H of the output shaft 15 and having flowed out from the distal end 15T of the output shaft 15 is dropped or spattered in the cylindrical portion 80 and attached to the cylindrical portion 80 (see arrow F in FIG. 1). The clutch oil attached to the inside of the cylindrical portion 80 is guided into the clutch center 40. Accordingly, clutch oil flows out of the clutch center 40 through the oil flow holes 49. Clutch oil also flows out of the clutch center 40 through the gap between the center-side fitting portion 58 and the pressure-side fitting portion 88. Then, clutch oil that has flowed out of the clutch center 40 is supplied to the input-side rotating plates 20 and the output-side rotating plates 22.

On the other hand, in the clutch device 10, when the driver of the motorcycle performs clutch operation (e.g., the driver operates the clutch operation lever) in the clutch-ON state, the clutch release mechanism (not shown) presses the push rod 16A, and thus, the pressure plate 70 is displaced in a direction away from the clutch center 40 (second direction D2) against a biasing force of the pressure springs 25. Accordingly, the clutch center 40 enters a clutch-OFF state (clutch disengaged stage) in which friction coupling between the input-side rotating plates 20 and the output-side rotating plates 22 is canceled, and thus, rotational driving attenuates or stops. That is, a rotation driving force of the engine is interrupted to the clutch center 40. The pressure plate 70 moves in the second direction D2 when the state where the clutch is engaged (clutch ON state) is switched to the state where the clutch is disengaged (clutch OFF state) through the half-clutch state by clutch operation of the driver.

In the clutch-OFF state, clutch oil distributed in the hollow portion H of the output shaft 15 and having flowed out of the distal end 15T of the output shaft 15 is guided into the clutch center 40 in the same or substantially the same manner as in the clutch-ON state. At this time, since the pressure plate 70 is separated from the clutch center 40, the amount of fitting between the pressure plate 70 and each of the center-side fitting portion 58 and the pressure-side fitting portion 88 decreases. As a result, clutch oil in the cylindrical portion 80 actively flows out of the clutch center 40, and is distributed to portions in the clutch device 10. In particular, clutch oil can be actively guided to gaps between the input-side rotating plates 20 and the output-side rotating plates 22 separated from each other.

Then, when the driver cancels the clutch operation lever in the clutch-OFF state, pressing of the pressure plate 70 by the clutch release mechanism (not shown) through the push member 16B is canceled, and thus, the pressure plate 70 is displaced with a biasing force of the pressure springs 25 to a direction (first direction D1) of approaching the clutch center 40.

Figure 15:
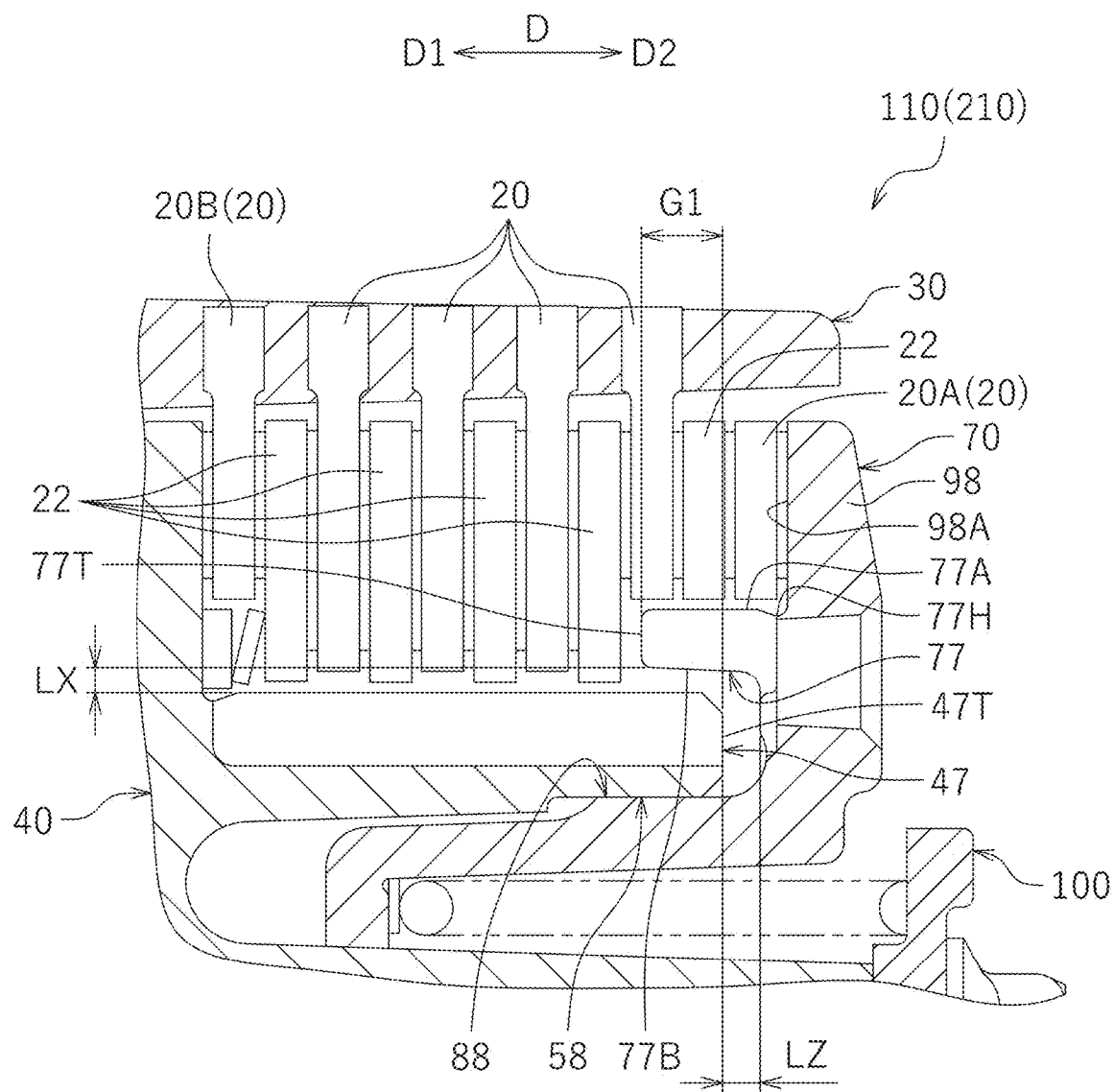
FIG. 15 is a partially enlarged cross-sectional view showing a positional relationship between a clutch center and a pressure plate in a normal state according to each of a second preferred embodiment and a third preferred embodiment of the present invention.

FIG. 15 is a partially enlarged cross-sectional view of the normal state (clutch engaged state) of a clutch device 110 according to a second preferred embodiment and a clutch device 210 according to a third preferred embodiment. As illustrated in FIG. 15, in the clutch device 110 and the clutch device 210, in the clutch engaged state, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G1. In the clutch engaged state, the distance LX between the center-side fitting teeth 47 and the pressure-side fitting teeth 77 in the radial directions is smaller than a distance LZ between the ends 47T of the center-side fitting teeth 47 in the second direction D2 and the pressure plate 70 (flange 98 in this preferred embodiment). The distance LX may be larger than the distance LZ. In the clutch device 110 and the clutch device 210, when the temperature changes in a usable temperature range (e.g., about −10° C. to about 400° C.) from a low temperature range (e.g., about −10° C. to about 40° C.) to a high temperature range (e.g., about 80° C. to about 400° C.), a portion of one of the center-side fitting teeth 47 overlap with a portion of one of the pressure-side fitting teeth 77 when seen in the radial directions of the output shaft 15 (see FIGS. 15 to 21) over the entire usable temperature range. The low temperature range is, for example, an outdoor temperature before the engine starts. The high temperature range is, for example, a temperature of the clutch device 110, 210 in operation after warming up of the engine.

Second Preferred Embodiment

Figure 16:
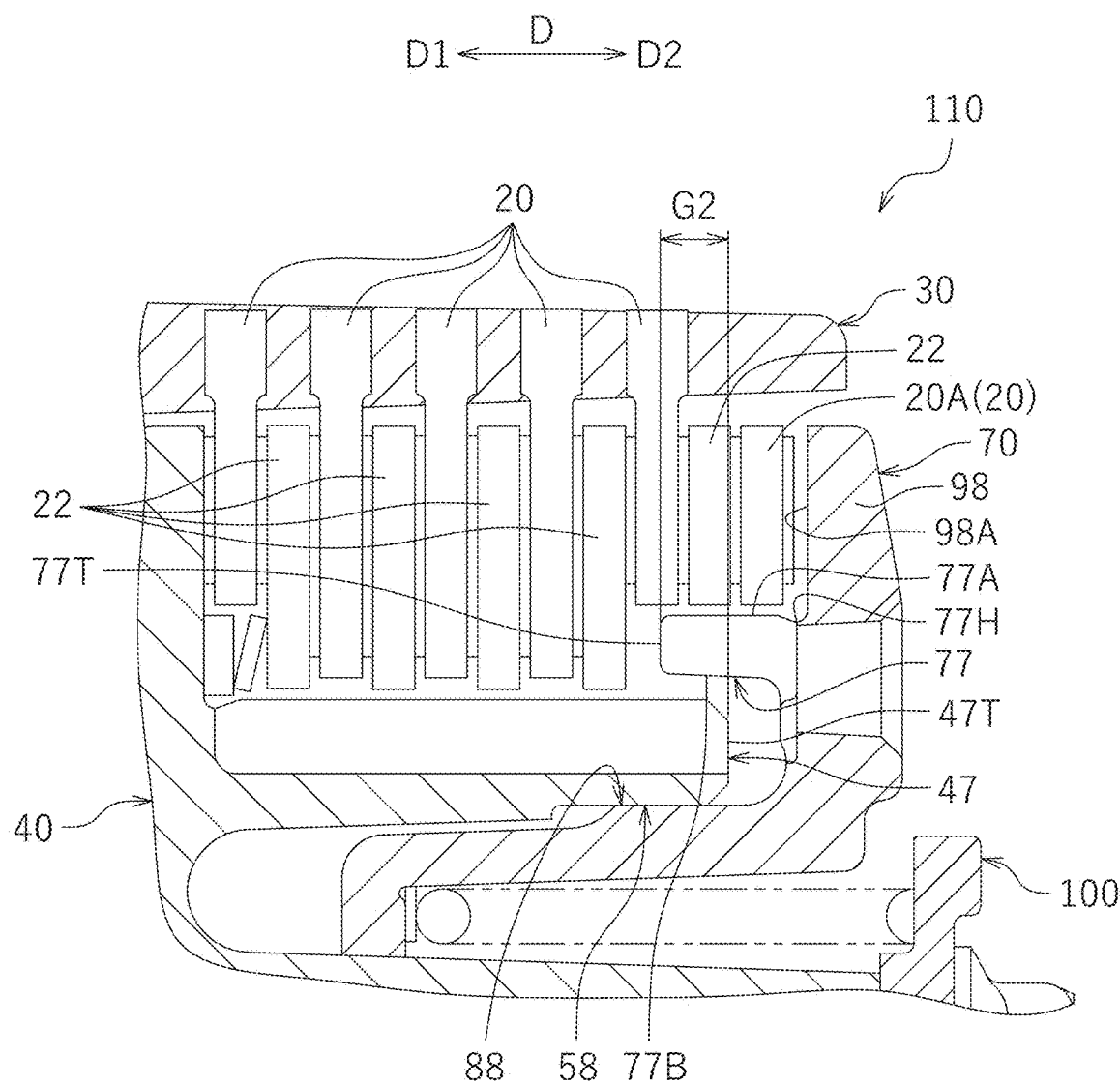
FIG. 16 is a partially enlarged cross-sectional view showing a positional relationship between the clutch center and the pressure plate according to the second preferred embodiment of the present invention in a half-clutch state.
Figure 17:
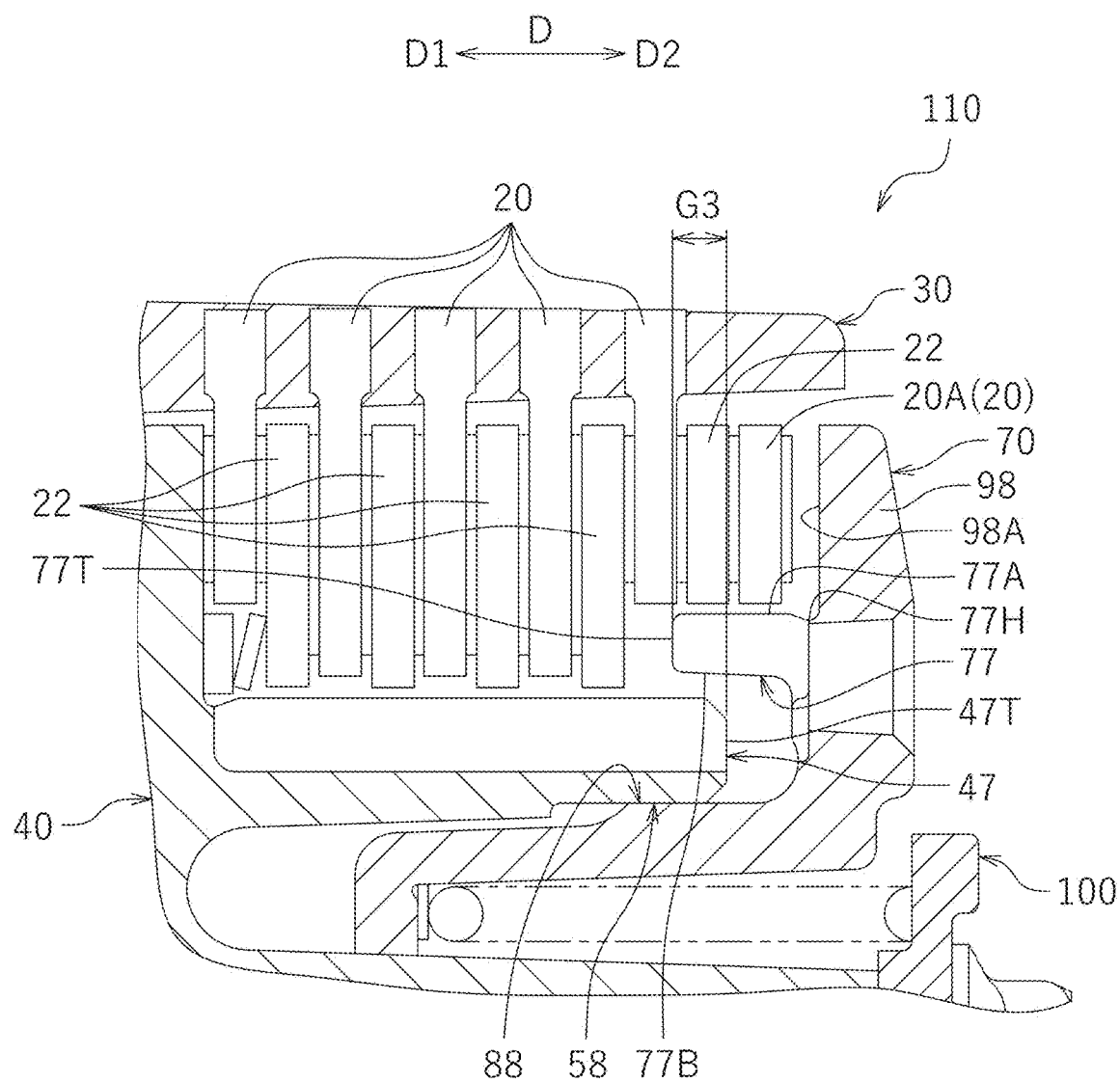
FIG. 17 is a partially enlarged cross-sectional view showing a positional relationship between the clutch center and the pressure plate according to the second preferred embodiment of the present invention in a clutch disengaged state.
Figure 18:
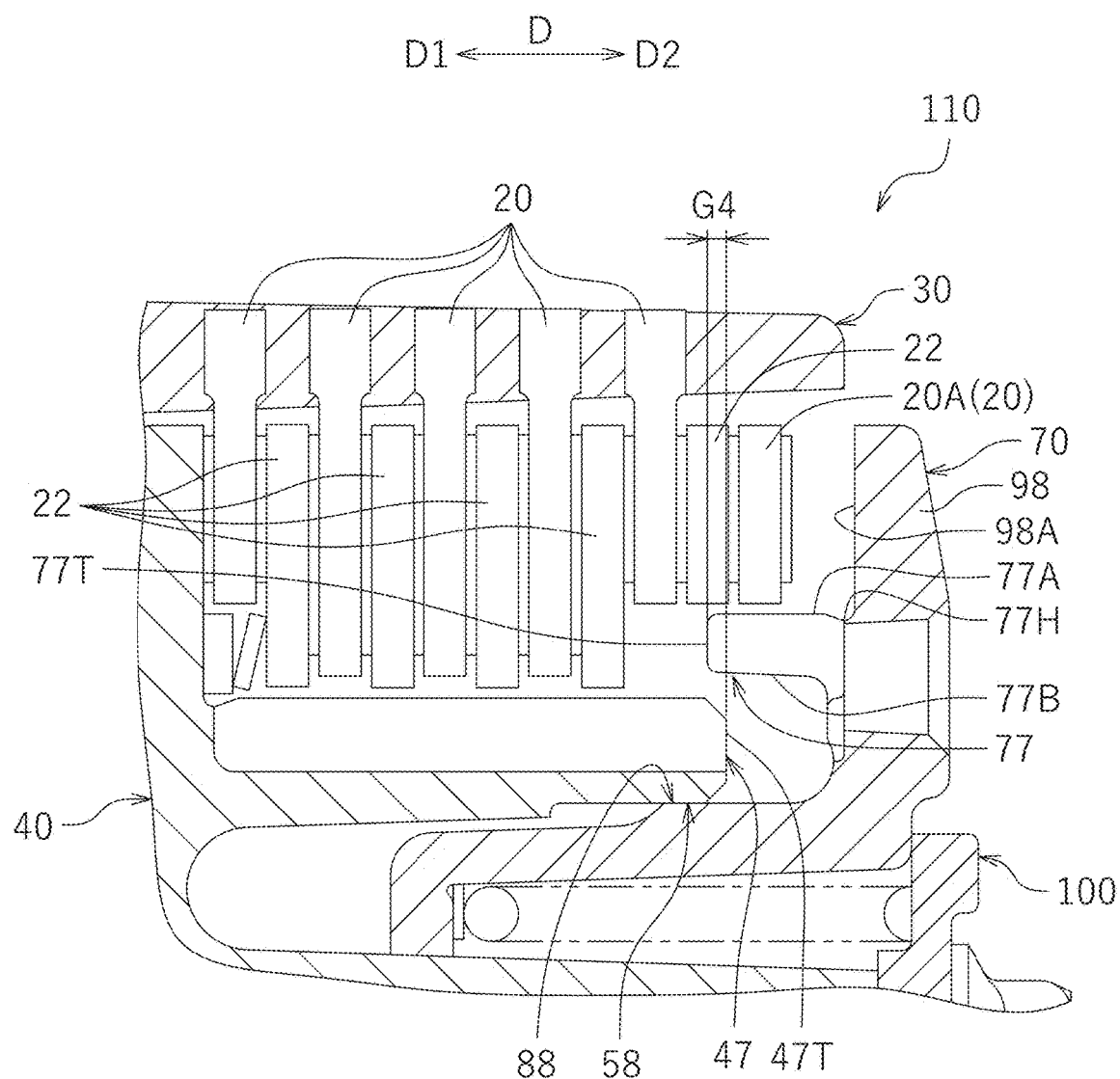
FIG. 18 is a partially enlarged cross-sectional view showing a positional relationship between the clutch center and the pressure plate according to the second preferred embodiment of the present invention when the pressure plate is brought into contact with a stopper plate.

As illustrated in FIGS. 16 to 18, in the clutch device 110 according to the second preferred embodiment, when the pressure plate 70 moves in a direction away from the clutch center 40 (i.e., in the second direction D2), the whole of the input-side rotating plates 20 and the output-side rotating plates 22 remains in the clutch center 40, and a gap (gap in the directions D) is formed between the pressure plate 70 (more specifically, the flange 98) and an input-side rotating plate 20A located at the front in the second direction D2 in the plurality of input-side rotating plates 20 and the plurality of output-side rotating plates 22.

As illustrated in FIG. 16, in the clutch device 110, in the half-clutch state, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G2 (G1>G2). That is, no gap is formed in the directions D between the ends 77T of the pressure-side fitting teeth 77 in the first direction D1 and the ends 47T of the center-side fitting teeth 47 in the second direction D2. Accordingly, even in a case where clutch oil flowing from the inside of the clutch center 40 is spattered to the radially outside by the centrifugal force, a most portion of the clutch oil hits the pressure-side fitting teeth 77, and as a result, clutch oil is supplied to, for example, the output-side rotating plates 22 held by the pressure-side fitting teeth 77. The half-clutch state refers to a state between the state where the clutch is engaged (see FIG. 15) and the state where the clutch is disengaged (see FIG. 17).

As illustrated in FIG. 17, in the clutch device 110, in the clutch disengaged state, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G3 (G2>G3). That is, no gap is formed in the directions D between the ends 77T of the pressure-side fitting teeth 77 in the first direction D1 and the ends 47T of the center-side fitting teeth 47 in the second direction D2.

As illustrated in FIG. 18, in the clutch device 110, in a state where the pressure plate 70 is in contact with the stopper plate 100, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G4 (G3>G4). That is, no gap is formed in the directions D between the ends 77T of the pressure-side fitting teeth 77 in the first direction D1 and the ends 47T of the center-side fitting teeth 47 in the second direction D2.

Third Preferred Embodiment

Figure 19:
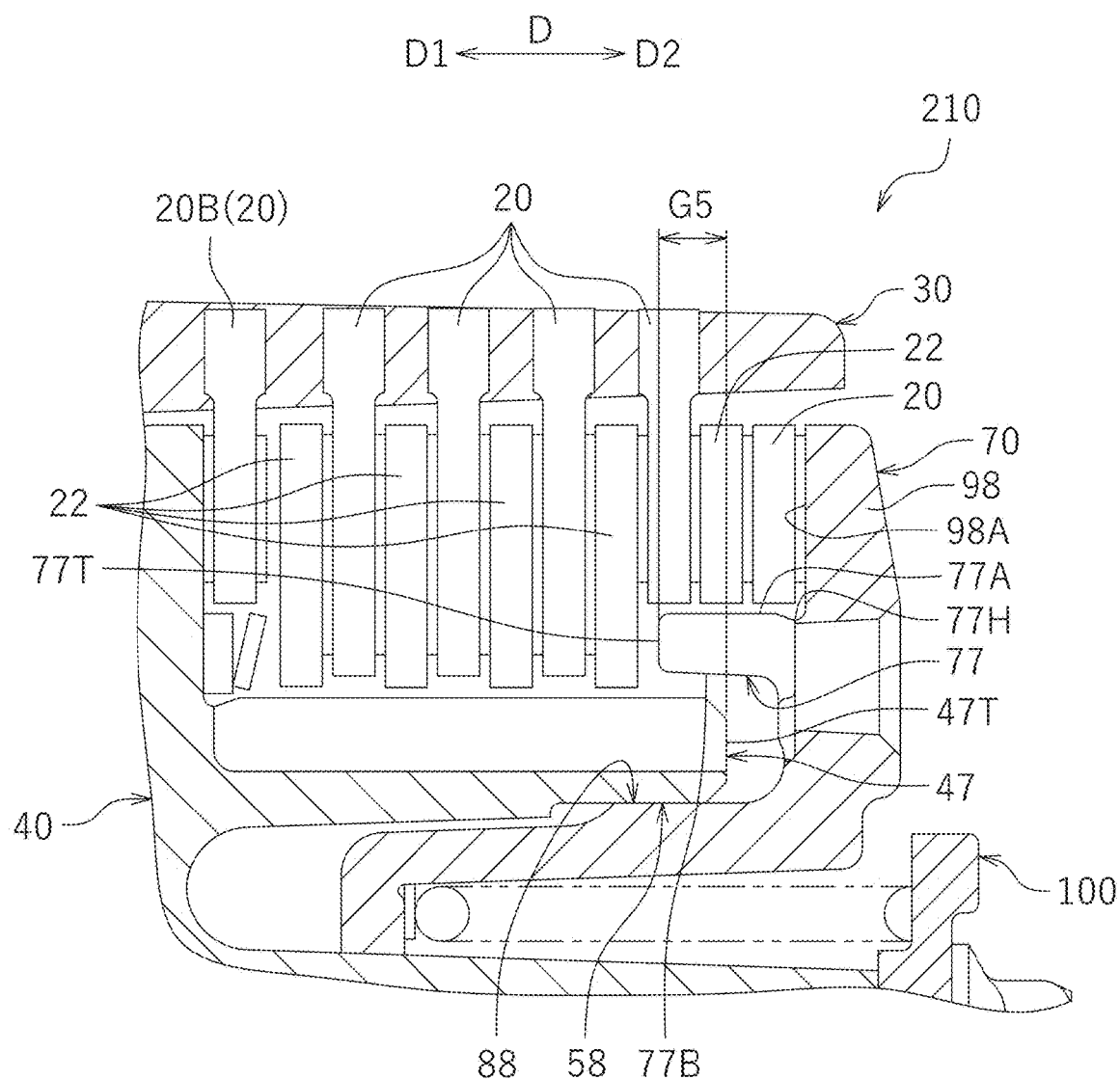
FIG. 19 is a partially enlarged cross-sectional view showing a positional relationship between the clutch center and the pressure plate according to the third preferred embodiment of the present invention in a half-clutch state.
Figure 20:
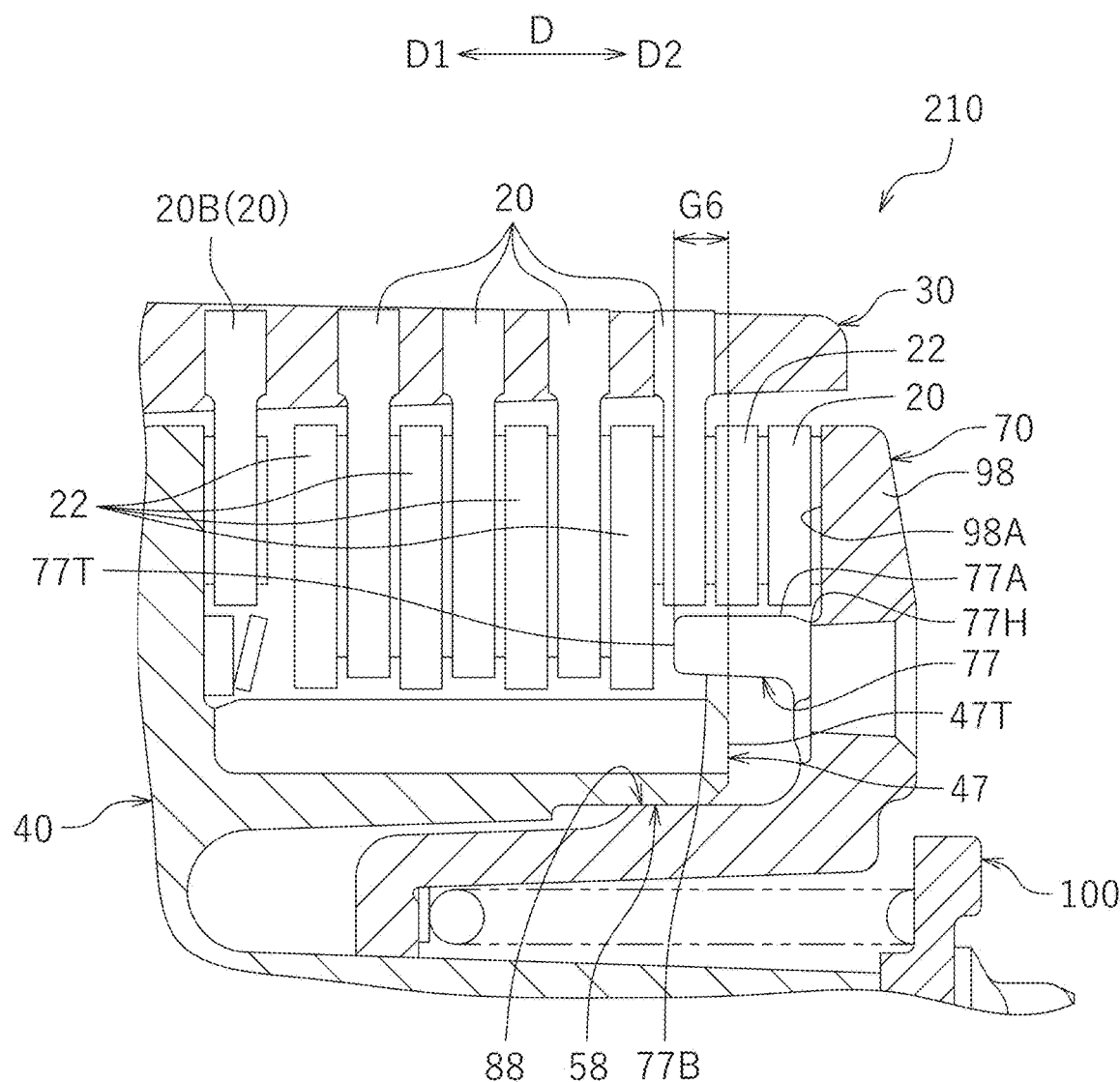
FIG. 20 is a partially enlarged cross-sectional view showing a positional relationship between the clutch center and the pressure plate according to the third preferred embodiment of the present invention in a clutch disengaged state.
Figure 21:
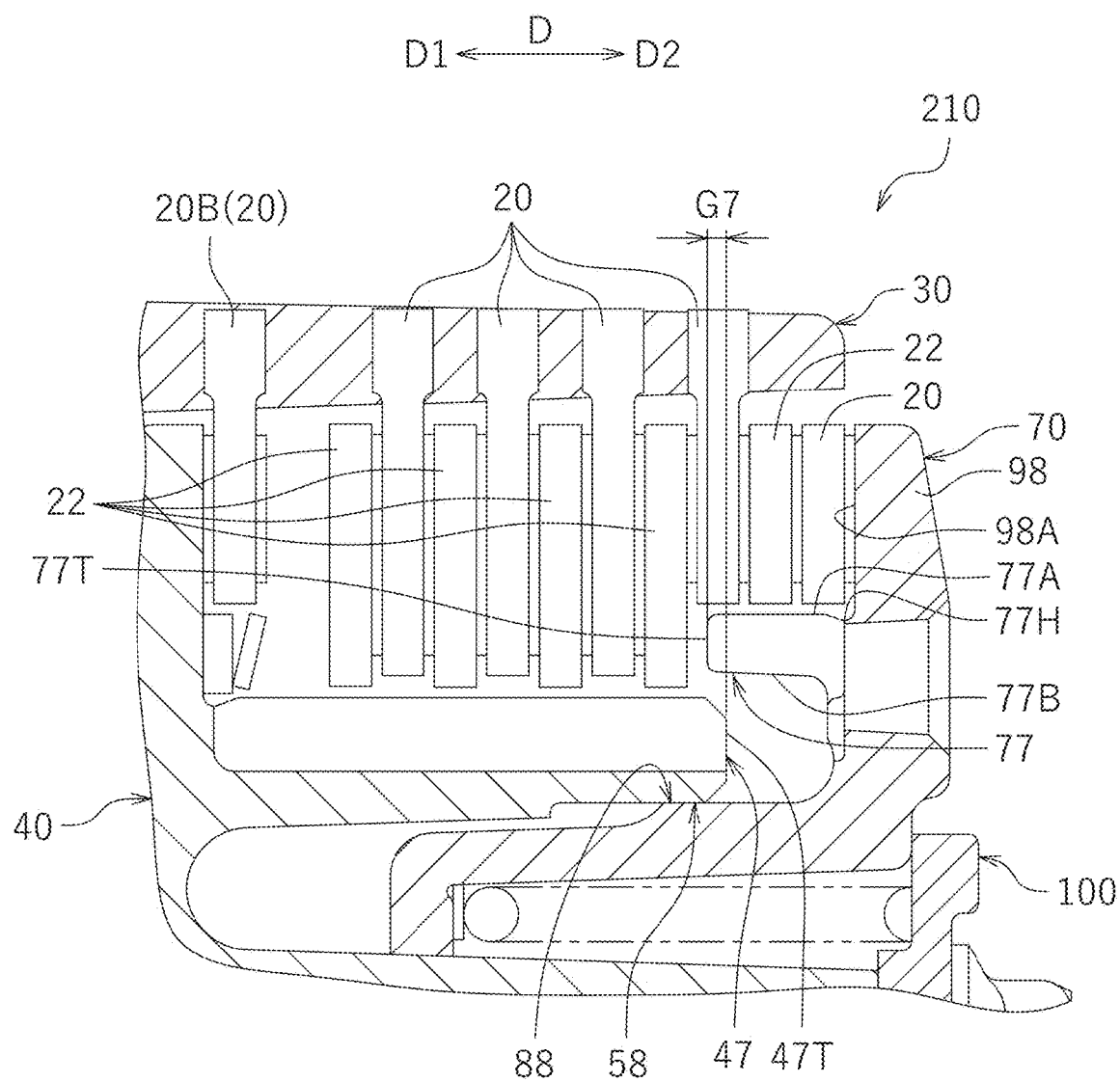
FIG. 21 is a partially enlarged cross-sectional view showing a positional relationship between the clutch center and the pressure plate according to the third preferred embodiment of the present invention when the pressure plate is brought into contact with a stopper plate.

As illustrated in FIGS. 19 to 21, in the clutch device 210 according to the third preferred embodiment, when the pressure plate 70 moves in a direction away from the clutch center 40 (i.e., in the second direction D2), only an input-side rotating plate 20B located at the front in the first direction D1 in the input-side rotating plates 20 remains in the clutch center 40, and a gap (gap in the directions D) is formed between the input-side rotating plate 20B and the output-side rotating plates 22. The gap in the directions D formed when the pressure plate 70 moves away from the clutch center 40 is not limited to a gap between the input-side rotating plate 20B and the output-side rotating plates 22. For example, the gap may be formed between the clutch center 40 and the input-side rotating plate 20B, between adjacent ones of the input-side rotating plates 20 and output-side rotating plates 22, or between the pressure plate 70 and the input-side rotating plates 20.

As illustrated in FIG. 19, in the clutch device 210, in the half-clutch state, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G5 (G1>G5). That is, no gap is formed in the directions D between the ends 77T of the pressure-side fitting teeth 77 in the first direction D1 and the ends 47T of the center-side fitting teeth 47 in the second direction D2.

As illustrated in FIG. 20, in the clutch device 210, in the clutch disengaged state, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G6 (G5>G6). That is, no gap is formed in the directions D between the ends 77T of the pressure-side fitting teeth 77 in the first direction D1 and the ends 47T of the center-side fitting teeth 47 in the second direction D2.

As illustrated in FIG. 21, in the clutch device 210, in a state where the pressure plate 70 is in contact with the stopper plate 100, a portion of one of the center-side fitting teeth 47 overlap with a portion of one of the pressure-side fitting teeth 77 when seen in the radial directions of the output shaft 15 (i.e., when seen in a direction orthogonal to the directions D). In this preferred embodiment, in the directions D, the center-side fitting teeth 47 overlap with the pressure-side fitting teeth 77 in a length G7 (G6>G7). That is, no gap is formed in the directions D between the ends 77T of the pressure-side fitting teeth 77 in the first direction D1 and the ends 47T of the center-side fitting teeth 47 in the second direction D2.

As described above, in the clutch device 110 according to the second preferred embodiment and the clutch device 210 according to the third preferred embodiment, in each of the half-clutch state, the clutch disengaged state, and the state where the pressure plate 70 is in contact with the stopper plate 100, a portion of one of the center-side fitting teeth 47 overlap with a portion of one of the pressure-side fitting teeth 77 when seen in the radial directions of the output shaft 15. That is, in each of the half-clutch state, the clutch disengaged state, and the state where the pressure plate 70 is in contact with the stopper plate 100, since no gap is formed between the pressure-side fitting teeth 77 and the center-side fitting teeth 47 in the directions D, clutch oil flowing in the clutch center 40 does not flow directly to the outside and flows to the pressure plate 70, for example. Accordingly, a larger amount of clutch oil can be supplied to the output-side rotating plates 22 and the input-side rotating plates 20 held by the pressure plate 70.

In the clutch device 110 according to the second preferred embodiment and the clutch device 210 according to the third preferred embodiment, when seen in the radial directions of the output shaft 15, the pair of side surfaces 77F of each of the pressure-side fitting teeth 77 in the circumferential directions S tilt to approach each other in the first direction D1. In this configuration, the pressure plate 70 can be easily moved toward or away from the clutch center 40.

In the clutch device 110 according to the second preferred embodiment and the clutch device 210 according to the third preferred embodiment, in the clutch engaged state, the distance LX between the center-side fitting teeth 47 and the pressure-side fitting teeth 77 in the radial directions S may be larger than the distance LZ between the ends 47T of the center-side fitting teeth 47 in the second direction D2 and the pressure plate 70 in the directions D. In this configuration, clutch oil more easily flows in the gap between the pressure-side fitting teeth 77 and the center-side fitting teeth 47.

In the clutch device 110 according to the second preferred embodiment and the clutch device 210 according to the third preferred embodiment, when the temperature of each of the clutch device 110 and the clutch device 210 changes in a usable temperature range from a low temperature range to a high temperature range, a portion of one of the center-side fitting teeth 47 overlap with a portion of one of the pressure-side fitting teeth 77 when seen in the radial directions of the output shaft 15, over the entire usable temperature range. With this configuration, in the usable temperature range of the clutch device 110 and the clutch device 210, no gap is formed between the pressure-side fitting teeth 77 and the center-side fitting teeth 47 in the directions D, and thus, clutch oil flowing in the clutch center 40 does not flow directly to the outside but flows to the pressure plate 70, for example. Accordingly, a larger amount of clutch oil can be supplied to the output-side rotating plates 22 and the input-side rotating plates 20 held by the pressure plate 70.

Fourth Preferred Embodiment

Figure 22:
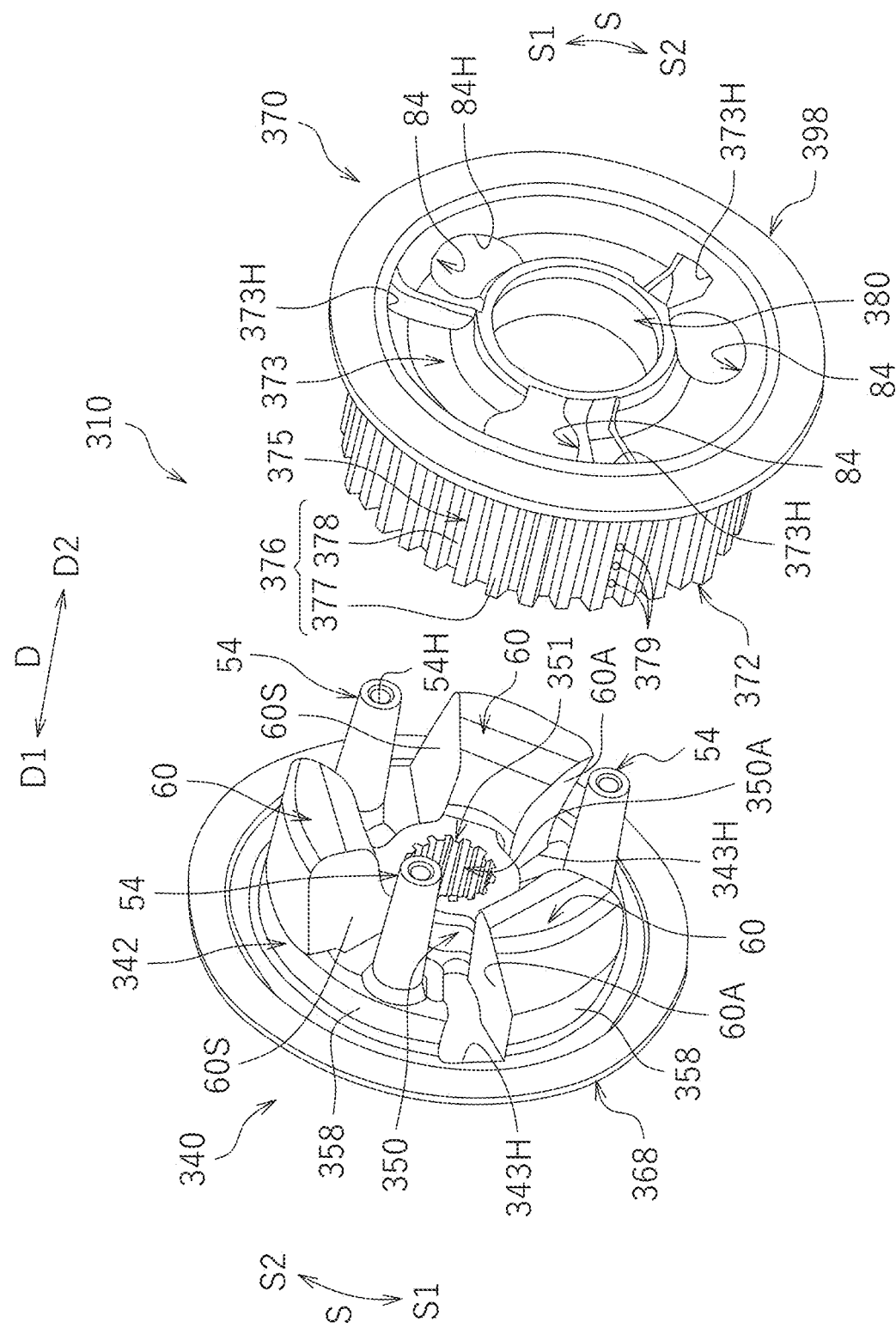
FIG. 22 is a disassembled perspective view of a clutch center and a pressure plate according to a fourth preferred embodiment of the present invention.

FIG. 22 is a disassembled perspective view of a clutch center 340 and a pressure plate 370 of a clutch device 310 according to a fourth preferred embodiment.

The clutch center 340 is housed in a clutch housing 30 (see FIG. 1). The clutch center 340 and the clutch housing 30 are concentrically disposed. As illustrated in FIG. 22, the clutch center 340 includes a body 342, and a flange 368 connected to the outer edge of the body 342 on the side of the first direction D1 and extending radially outward. The body 342 projects ahead of the flange 368 in the second direction D2. The clutch center 340 does not hold the output-side rotating plates 22. The clutch center 340 is rotationally driven together with an output shaft 15 (see FIG. 1).

As illustrated in FIG. 22, the body 342 includes an output shaft holding portion 350, a plurality of center-side cam portions 60, and a center-side fitting portion 358. The center-side cam portions 60 projects from the flange 368 in the second direction D2. The center-side cam portions 60 are located radially outward of the output shaft holding portion 350. The center-side cam portions 60 are formed integrally with the output shaft holding portion 350.

The output shaft holding portion 350 has a cylindrical shape. The output shaft holding portion 350 has an insertion hole 351 in which the output shaft 15 (see FIG. 1) is inserted and spline-fitted. The insertion hole 351 penetrates the body 342. An inner peripheral surface 350A of the output shaft holding portion 350 defining the insertion hole 351 includes a plurality of spline grooves formed along the axial direction. The output shaft 15 is coupled to the output shaft holding portion 350.

As illustrated in FIG. 22, the clutch center 340 includes a plurality of (for example, three in this preferred embodiment) bosses 54. The bosses 54 are located radially outward of the output shaft holding portion 350. The bosses 54 are disposed on the body 342.

As illustrated in FIG. 22, the clutch center 340 includes center-side cam holes 343H penetrating the body 342 and a portion of the flange 368. The center-side cam holes 343H penetrate the body 342 and the flange 368 in the directions D. The center-side cam holes 343H extend from portions on the side of the output shaft holding portion 350 to the flange 368. The center-side cam holes 343H are formed between the center-side assist cam surface 60A of the center-side cam portions 60 and the bosses 54. When seen in the axial direction of the clutch center 340, the center-side assist cam surface 60A overlaps with a portion of the center-side cam holes 343H.

As illustrated in FIG. 22, the center-side fitting portion 358 is disposed on the body 342. The center-side fitting portion 358 is located radially outward of the center-side cam portions 60. The center-side fitting portion 358 is located ahead of the center-side cam portions 60 in the first direction D1. The center-side fitting portion 358 is configured to slidably fit in the pressure-side fitting portion 388 (see FIG. 23).

As illustrated in FIG. 22, the flange 368 extends radially outward from the outer edge of the body 342. In this preferred embodiment, the flange 368 extends radially outward form the outer edge of the center-side fitting portion 358. The flange 368 is configured to press the input-side rotating plates 20 and the output-side rotating plates 22. The flange 368 is located ahead of the input-side rotating plates 20 and the output-side rotating plates 22 in the first direction D1. The input-side rotating plates 20 and the output-side rotating plates 22 are sandwiched between the flange 368 and the flange 398 of the pressure plate 370.

The pressure plate 370 is movable toward or away from the clutch center 340 and rotatable relative to the clutch center 340. The pressure plate 370 is configured to press the input-side rotating plates 20 and the output-side rotating plates 22. The pressure plate 370 is disposed coaxially with the clutch center 340 and the clutch housing 30. The pressure plate 370 includes a cylindrical body 372, and the flange 398 extending radially outward from the outer edge of the body 372. The pressure plate 370 includes the plurality of output-side rotating plates 22 arranged alternately with the input-side rotating plates 20 in the directions D. In this preferred embodiment, the output-side rotating plates 22 are held only by the pressure plate 370.

Figure 23:
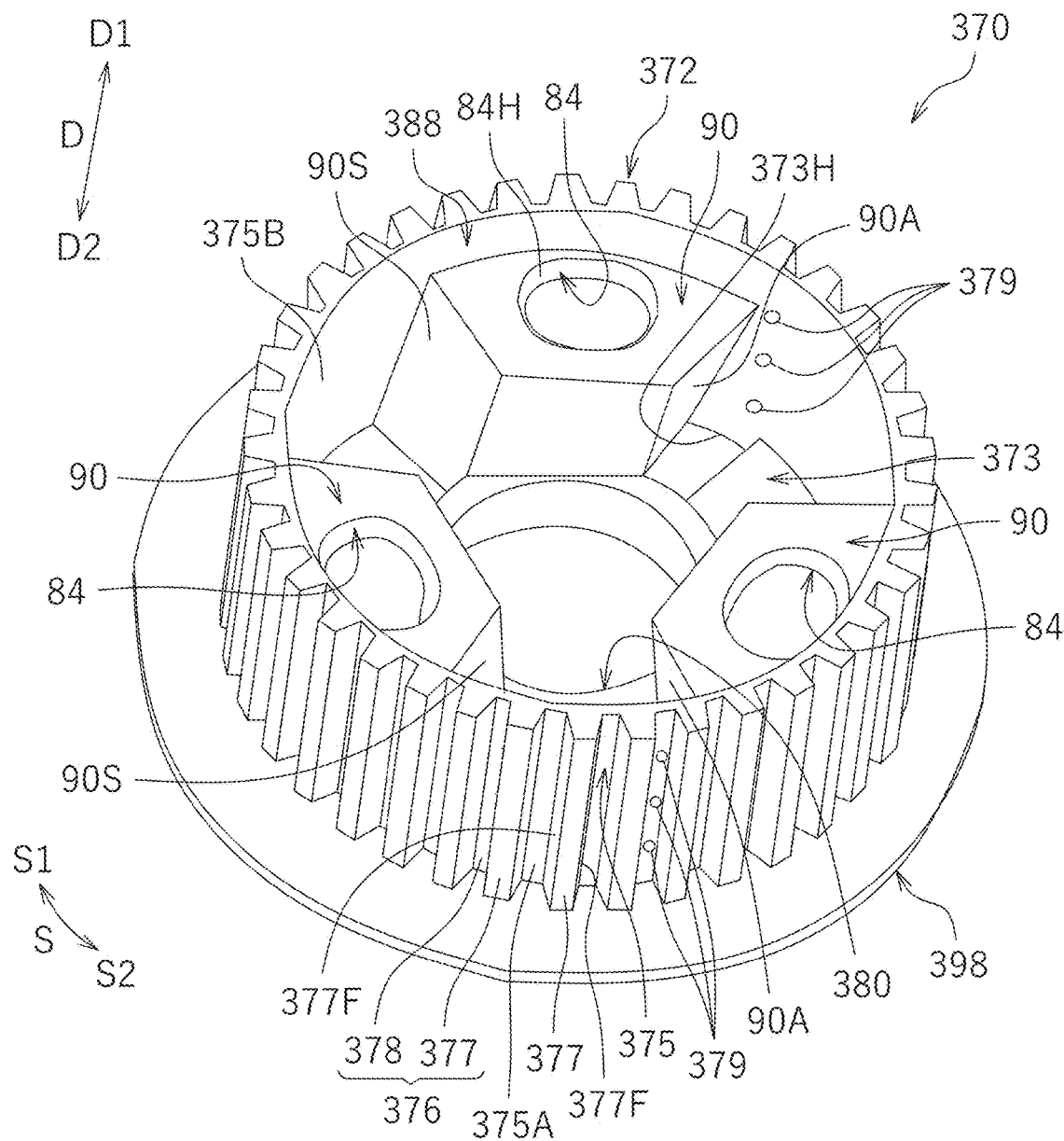
FIG. 23 is a perspective view of the pressure plate according to the fourth preferred embodiment of the present invention.

As illustrated in FIG. 23, the body 372 includes a ring-shaped base wall 373, an outer peripheral wall 375 located radially outward of the base wall 373 and extending in the first direction D1, a cylindrical portion 380 disposed at a center of the base wall 373, a plurality of pressure-side cam portions 90 connected to the base wall 373 and the outer peripheral wall 375, a pressure-side fitting portion 388, and spring housing portions 84 (see FIG. 22). The pressure-side cam portions 90 project from the body 372 in the first direction D1. The pressure-side cam portions 90 are located radially outward of the cylindrical portion 380. The pressure-side cam portions 90 are located inward of the outer peripheral wall 375.

The cylindrical portion 380 has a cylindrical shape. The cylindrical portion 380 is formed integrally with the pressure-side cam portions 90. The cylindrical portion 380 houses a distal end 15T of the output shaft 15 (see FIG. 1). The cylindrical portion 380 houses a release bearing 18 (see FIG. 1). The cylindrical portion 380 receives a pressing force from a push member 16B. The cylindrical portion 380 receives clutch oil that has flowed out from the distal end 15T of the output shaft 15.

As illustrated in FIG. 23, an outer peripheral wall 375 of the pressure plate 370 is located radially outward of the cylindrical portion 380. The outer peripheral wall 375 is integrally formed with the cylindrical portion 380. The outer peripheral wall 375 has a ring shape extending in the directions D. An outer peripheral surface 375A of the outer peripheral wall 375 has a spline fitting portion 376. The spline fitting portion 376 includes a plurality of pressure-side fitting teeth 377 extending in the axial direction of the pressure plate 370 along the outer peripheral surface 375A of the outer peripheral wall 375, a plurality of spline grooves 378 each formed between adjacent ones of the pressure-side fitting teeth 377 and extending in the axial direction of the pressure plate 370, and oil flow holes 379. The pressure-side fitting teeth 377 hold the output-side rotating plates 22. The plurality of pressure-side fitting teeth 377 are arranged in the circumferential directions S. The plurality of pressure-side fitting teeth 377 are arranged at regular or substantially regular intervals in the circumferential directions S. The plurality of pressure-side fitting teeth 377 have the same or substantially the same shape. The pressure-side fitting teeth 377 project radially outward form the outer peripheral surface 375A of the outer peripheral wall 375. A pair of side surfaces 377F of each of the pressure-side fitting teeth 377 in the circumferential directions S tilt to gradually approach each other in the first direction D1 when seen in the radial directions of the output shaft 15. The oil flow holes 379 penetrate the outer peripheral wall 375 in the radial directions. Each of the oil flow holes 379 is formed between adjacent ones of the pressure-side fitting teeth 377. That is, the oil flow holes 379 are formed in the spline grooves 378. The oil flow holes 379 are formed at the sides of the pressure-side cam portions 90. More specifically, the oil flow holes 379 are formed at the sides of pressure-side assist cam surfaces 90A of the pressure-side cam portions 90. The oil flow holes 379 are located ahead of the pressure-side assist cam surfaces 90A in the first circumferential direction S1. The oil flow holes 379 are located ahead of pressure-side slipper cam surfaces 90S in the second circumferential direction S2. In this preferred embodiment, three oil flow holes 379 are formed in each of three portions of the outer peripheral wall 375 in the circumferential directions S. The oil flow holes 379 are arranged at regular or substantially regular intervals in the circumferential directions S. The oil flow holes 379 cause the inside and outside of the pressure plate 370 to communicate with each other. The oil flow holes 379 allow clutch oil that has flowed from the output shaft 15 into the pressure plate 370 to be discharged to the outside of the pressure plate 370. In this Preferred embodiment, the oil flow holes 379 allow clutch oil flowing at an inner peripheral surface 375B of the outer peripheral wall 375 to be discharged to the outside of the pressure plate 370. At least a portion of the oil flow holes 379 faces the center-side fitting portion 358 (see FIG. 22).

The output-side rotating plates 22 are held by the spline fitting portion 376 of the pressure plate 370. The output-side rotating plates 22 are held by the pressure-side fitting teeth 377 and the spline grooves 378 by spline-fitting. The output-side rotating plates 22 are displaceable along the axial direction of the pressure plate 370. The output-side rotating plates 22 are rotatable together with the pressure plate 370.

As illustrated in FIGS. 22 and 23, the pressure plate 370 includes pressure-side cam holes 373H penetrating a portion of the base wall 373. The pressure-side cam holes 373H penetrate the base wall 373 in the directions D. The pressure-side cam holes 373H are located radially outward of the cylindrical portion 380. The pressure-side cam holes 373H extend from the sides of the cylindrical portion 380 to the outer peripheral wall 375. Each of the pressure-side cam holes 373H penetrates a portion between adjacent ones of the pressure-side cam portions 90. Each of the pressure-side cam holes 373H penetrates a portion between the pressure-side assist cam surface 90A and the pressure-side slipper cam surface 90S of adjacent ones of the pressure-side cam portions 90. When seen in the axial direction of the pressure plate 370, the pressure-side assist cam surface 90A overlaps with a portion of the pressure-side cam holes 373H. Clutch oil flows into the pressure-side cam holes 373H from the outside of the pressure plate 370.

As illustrated in FIG. 23, the pressure-side fitting portion 388 is located radially outward of the cylindrical portion 380. The pressure-side fitting portion 388 is located radially outward of the pressure-side cam portions 90. The pressure-side fitting portion 388 is located ahead of the pressure-side cam portions 90 in the first direction D1. The pressure-side fitting portion 388 is formed on the inner peripheral surface 375B of the outer peripheral wall 375. The pressure-side fitting portion 388 is configured to slidably fit on the center-side fitting portion 358 (see FIG. 22). A gap is formed between the pressure-side fitting portion 388 and the center-side fitting portion 358.

The foregoing description is directed to the preferred embodiments of the present disclosure. The preferred embodiments described above, however, are merely examples, and the present disclosure can be performed in various modes and through various preferred embodiments.

In the preferred embodiments described above, the clutch devices 10, 110, 210, and 310 are so-called manual clutches each configured to allow or interrupt transfer of a rotation driving force of an engine to a transmission by clutch operation of a driver (e.g., operation of a clutch operation lever by a driver), but are not limited to such clutches. The clutch devices 10, 110, 210, and 310 may also be so-called automated clutches each configured to allow or interrupt transfer of a rotation driving force of an engine to a transmission automatically by a clutch actuator.

In each of the preferred embodiments described above, the output shaft holding portion 50 and the outer peripheral wall 45 are integrally formed in the clutch center 40, but the present disclosure is not limited to this example. For example, the clutch center 40 may include a first member including the output shaft holding portion 50 and a second member formed as a separate component from the first member and including the outer peripheral wall 45 so that the first member and the second member are fitted to each other in application.

In the fourth preferred embodiment, the clutch center 340 does not hold the output-side rotating plates 22, but the present disclosure is not limited to this example. The clutch center 340 may include center-side fitting teeth having a configuration similar to the pressure-side fitting teeth 77 of the first preferred embodiment capable of holding the output-side rotating plates 22.

The overlapping state of the pressure-side fitting teeth and the center-side fitting teeth in the half-clutch state recited in claims is irrelevant to whether or not to visibly confirm in the state where the input-side rotating plates and the output-side rotating plates are attached to the clutch center and the pressure plate. In other words, if the overlapping state of the pressure-side fitting teeth and the center-side fitting teeth conforms to the state recited in claims with the input-side rotating plates and the output-side rotating plates attached to the clutch center and the pressure plate, this overlapping state is included in the scope of the claims even if it cannot be visibly confirmed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or interrupt transfer of a rotation driving force of an input shaft to an output shaft, the clutch device comprising:
   a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
   a pressure plate movable toward or away from the clutch center and rotatable relative to the clutch center to press the input-side rotating plates and the output-side rotating plates; wherein
   the pressure plate includes:
      a plurality of pressure-side fitting teeth holding at least one of the output-side rotating plates and arranged in circumferential directions,
   the clutch center includes:
      an output shaft holding portion to which the output shaft is coupled;
      an outer peripheral wall located radially outward of the output shaft holding portion and integral with the output shaft holding portion; and
      a plurality of center-side fitting teeth holding the output-side rotating plates, projecting radially outward from an outer peripheral surface of the outer peripheral wall, and arranged in circumferential directions;
   assuming a direction in which the pressure plate approaches the clutch center is a first direction and a direction in which the pressure plate moves away from the clutch center is a second direction, the pressure plate is movable in the second direction when a clutch engaged state shifts to a clutch disengaged state through a half-clutch state by clutch operation of a driver; and
   in the half-clutch state, a portion of one of the center-side fitting teeth overlap with a portion of one of the pressure-side fitting teeth when seen in radial directions of the output shaft.

2. The clutch device according to claim 1, wherein assuming a direction in which the pressure plate moves toward or away from the clutch center is a movement direction, a direction in which the pressure plate approaches the clutch center is a first direction, and a direction in which the pressure plate moves away from the clutch center is a second direction, in the clutch engaged state, a distance between the center-side fitting teeth and the pressure-side fitting teeth in the radial directions is larger than a distance between ends of the center-side fitting teeth in the second direction and the pressure plate in the movement direction.

3. The clutch device according to claim 1, wherein when a temperature of the clutch device changes in a usable temperature range from a low temperature range to a high temperature range, a portion of one of the center-side fitting teeth overlap with a portion of one of the pressure-side fitting teeth when seen in the radial directions of the output shaft, over the entire usable temperature range.

4. A motorcycle comprising the clutch device according to claim 1.

5. A clutch device to allow or interrupt transfer of a rotation driving force of an input shaft to an output shaft, the clutch device comprising:
   a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and a pressure plate movable toward or away from the clutch center and rotatable relative to the clutch center to press the input-side rotating plates and the output-side rotating plates; wherein the pressure plate includes:
  a plurality of pressure-side fitting teeth holding at least one of the output-side rotating plates and arranged in circumferential directions;

the clutch center includes:
  an output shaft holding portion to which the output shaft is coupled;
  an outer peripheral wall located radially outward of the output shaft holding portion; and
  a plurality of center-side fitting teeth holding the output-side rotating plates, projecting radially outward from an outer peripheral surface of the outer peripheral wall, and arranged in circumferential directions;

in the half-clutch state, a portion of one of the center-side fitting teeth overlap with a portion of one of the pressure-side fitting teeth when seen in radial directions of the output shaft; and assuming a direction in which the pressure plate approaches the clutch center is a first direction and a direction in which the pressure plate moves away from the clutch center is a second direction, a pair of side surfaces of each of the pressure-side fitting teeth in the circumferential directions tilts to approach each other in the first direction when seen in the radial directions of the output shaft.

6. A clutch device to allow or interrupt transfer of a rotation driving force of an input shaft to an output shaft, the clutch device comprising:
  a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
  a pressure plate movable toward or away from the clutch center and rotatable relative to the clutch center to press the input-side rotating plates and the output-side rotating plates; wherein
  the pressure plate includes:
    a plurality of pressure-side fitting teeth holding at least one of the output-side rotating plates and arranged in circumferential directions;
  the clutch center includes:
    an output shaft holding portion to which the output shaft is coupled;
    an outer peripheral wall located radially outward of the output shaft holding portion and integral with the output shaft holding portion; and
    a plurality of center-side fitting teeth holding the output-side rotating plates, projecting radially outward from an outer peripheral surface of the outer peripheral wall, and arranged in circumferential directions;
  assuming a direction in which the pressure plate approaches the clutch center is a first direction and a direction in which the pressure plate moves away from the clutch center is a second direction, the pressure plate is movable in the second direction when a clutch engaged state shifts to a clutch disengaged state through a half-clutch state by clutch operation of a driver; and in the clutch disengaged state, a portion of one of the center-side fitting teeth overlap with a portion of one of the pressure-side fitting teeth when seen in radial directions of the output shaft.

7. A clutch device to allow or interrupt transfer of a rotation driving force of an input shaft to an output shaft, the clutch device comprising:
  a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged; and
  a pressure plate movable toward or away from the clutch center and rotatable relative to the clutch center to press the input-side rotating plates and the output-side rotating plates; wherein
  the pressure plate includes:
    a plurality of pressure-side fitting teeth holding at least one of the output-side rotating plates and arranged in circumferential directions;
  the clutch center includes:
    an output shaft holding portion to which the output shaft is coupled;
    an outer peripheral wall located radially outward of the output shaft holding portion; and
    a plurality of center-side fitting teeth holding the output-side rotating plates, projecting radially outward from an outer peripheral surface of the outer peripheral wall, and arranged in circumferential directions;
  in the clutch disengaged state, a portion of one of the center-side fitting teeth overlap with a portion of one of the pressure-side fitting teeth when seen in radial directions of the output shaft; and
  assuming a direction in which the pressure plate approaches the clutch center is a first direction and a direction in which the pressure plate moves away from the clutch center is a second direction, a pair of side surfaces of each of the pressure-side fitting teeth in the circumferential directions tilts to approach each other in the first direction when seen in the radial directions of the output shaft.

8. A clutch device to allow or interrupt transfer of a rotation driving force of an input shaft to an output shaft, the clutch device comprising:
  a clutch center housed in a clutch housing holding a plurality of input-side rotating plates to be rotationally driven by rotational driving of the input shaft, the clutch center being operable to hold a plurality of output-side rotating plates and to be rotationally driven together with the output shaft, the input-side rotating plates and the output-side rotating plates being alternately arranged;
  a pressure plate movable toward or away from the clutch center and rotatable relative to the clutch center to press the input-side rotating plates and the output-side rotating plates; and
  a stopper plate operable to contact the pressure plate and to suppress separation of the pressure plate from the clutch center by a predetermined distance or more; wherein
  the pressure plate includes:
    a plurality of pressure-side fitting teeth holding at least one of the output-side rotating plates and arranged in circumferential directions;

the clutch center includes:
- an output shaft holding portion to which the output shaft is coupled;
- an outer peripheral wall located radially outward of the output shaft holding portion; and
- a plurality of center-side fitting teeth holding the output-side rotating plates, projecting radially outward from an outer peripheral surface of the outer peripheral wall, and arranged in circumferential directions; and in a state where the pressure plate is in contact with the stopper plate, a portion of one of the center-side fitting teeth overlap with a portion of one of the pressure-side fitting teeth when seen in radial directions of the output shaft.

9. The clutch device according to claim 8, wherein assuming a direction in which the pressure plate approaches the clutch center is a first direction and a direction in which the pressure plate moves away from the clutch center is a second direction, a pair of side surfaces of each of the pressure-side fitting teeth in the circumferential directions tilts to approach each other in the first direction when seen in the radial directions of the output shaft.

* * * * *